US011138808B2

(12) United States Patent
Peters

(10) Patent No.: US 11,138,808 B2
(45) Date of Patent: Oct. 5, 2021

(54) APPARATUS AND METHOD FOR PROCESSOR-AIDED DESIGN OF A WORKHOLDING FRAME

(71) Applicant: THE BOEING COMPANY, Chicago, IL (US)

(72) Inventor: Justin Lee Peters, Alton, IL (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/354,843

(22) Filed: Mar. 15, 2019

(65) Prior Publication Data
US 2020/0294319 A1 Sep. 17, 2020

(51) Int. Cl.
G06T 15/00 (2011.01)
G06T 19/20 (2011.01)
G06T 17/00 (2006.01)
G06F 30/00 (2020.01)

(52) U.S. Cl.
CPC ............. G06T 19/20 (2013.01); G06F 30/00 (2020.01); G06T 17/00 (2013.01); G06T 2210/12 (2013.01)

(58) Field of Classification Search
CPC .......... G06F 30/00; G05B 2219/35043; G05B 2219/35218; G05B 2219/35025; G05B 2219/35134; G05B 2219/49123; G05B 19/4097; G05B 2219/36315; G05B 2219/50125
USPC ........................................................ 345/418
See application file for complete search history.

(56) References Cited

U.S. PATENT DOCUMENTS

| 7,271,481 | B2 * | 9/2007 | Khandros | ........... H01L 21/6836 257/698 |
| 9,235,658 | B2 * | 1/2016 | Nelaturi | ............. G05B 19/4097 |
| 9,690,274 | B1 * | 6/2017 | Markov | ................. B33Y 50/02 |
| 10,073,434 | B1 * | 9/2018 | Hollander | .............. G05B 19/31 |
| 10,089,416 | B1 * | 10/2018 | DuBose | ................. G05B 15/02 |
| 10,300,570 | B2 * | 5/2019 | Nelaturi | .................. G06T 19/20 |
| 10,466,681 | B1 * | 11/2019 | Jones | ............... G05B 19/40937 |
| 10,486,415 | B2 * | 11/2019 | Markov | ................. B33Y 50/02 |
| 10,549,517 | B2 * | 2/2020 | Crump | ................. B29C 64/112 |

(Continued)

OTHER PUBLICATIONS

Lynn R. Direct Digital Subtractive Manufacturing of Functional Assemblies Using Voxel-Based Models. Journal of manufacturing science and engineering. Nov. 2017;40(2).*

(Continued)

Primary Examiner — Phu K Nguyen

(57) ABSTRACT

A method of processor-aided design of a workholding frame for a manufacturing process includes using a processor to perform operations including receiving, by a processor, first data representing a first three-dimensional (3D) model of an object to be manufactured. The operations further include obtaining, by the processor, second data describing a second 3D model. The second 3D model represents a bounding box having one or more sides adjoining a surface of the object within the first 3D model. The operations further include automatically generating, by the processor and based on the first data and the bounding box, third data indicating one or more parameters of the workholding frame. The workholding frame and the object are to be formed based on the one or more parameters and as a single workpiece from a blank material during a machining process associated with the object.

27 Claims, 12 Drawing Sheets

(56) References Cited

U.S. PATENT DOCUMENTS

| | | | | |
|---|---|---|---|---|
| 10,726,618 B2* | 7/2020 | Elber | .................. | G06T 17/30 |
| 10,831,172 B2* | 11/2020 | Hebrard | .................. | G06T 17/10 |
| 10,889,099 B2* | 1/2021 | Markov | ............. | G05B 19/4097 |
| 2017/0259555 A1* | 9/2017 | Markov | .................. | G05B 17/02 |

OTHER PUBLICATIONS

Patterson AE, Allison JT. Manufacturability constraint formulation for design under hybrid additive-subtractive manufacturing. InASME 2018 International Design Engineering Technical Conferences and Computers and Information in Engineering Conference Jan. 1, 2018.*

Beaman JJ, Atwood C, Bergman TL, Bourell D, Hollister S, Rosen D. Additive/subtractive manufacturing research and development in Europe. World Technology Evaluation Center Inc Baltimore MD; Dec. 2004.*

Kerbrat O, Mognol P, Hascoet JY. Manufacturing complexity evaluation for additive and subtractive processes: application to hybrid modular tooling. In19th Solid Freeform Fabrication Symposium Aug. 2008 (pp. 519-530).*

Kerbrat O, Mognol P, Hascoet JY. Manufacturability analysis to combine additive and subtractive processes. Rapid Prototyping Journal. Jan. 19, 2010.*

Solanki et al, Don't Fear 5 Axis 2.0, 5 Axis, and 3+2: Toolpaths and Work-Holding Strategies and Work-Holding Strategies, Aug. 2, 2018, https://www.autodesk.com/autodesk-university/class/Dont-Fear-5-Axis-20-5-Axis-and-32-Toolpaths-and-Work-Holding-Strategies-2017.*

Primo, CNC Machining Technology Fundamentals,PDHonline Course M501 (8 PDH), 2013.*

"Fast algorithms to compute an approximation of the minimal volume oriented bounding box of a point cloud in 3D," <https://github.com/gabyx/ApproxMVBB> downloaded on Jan. 29, 2019, 8 pgs.

Barequet, Gill, "Efficiently Approximating the Minimum-Volume Bounding Box of a Point Set in Three Dimensions", Faculty of Computer Science, The Technion-IIT, Haifa, Israel, Jun. 30, 2001, 17 pgs.

* cited by examiner

APPARATUS AND METHOD FOR PROCESSOR-AIDED DESIGN OF A WORKHOLDING FRAME

FIELD

The present disclosure is generally related to processor-aided design of a workholding frame.

BACKGROUND

Computer-aided machining processes have improved significantly in recent decades. While much focus has been on additive manufacturing, such as three-dimensional printing, improvements have also occurred in subtractive manufacturing, such as computer-aided milling, laser ablation, and so forth. Subtractive manufacturing processes can be used for rapid prototyping, and in some cases, directly for manufacturing a final product.

Subtractive manufacturing processes are like sculpting or carving the object from a block of starting material. For example, in a subtractive manufacturing process, portions of a sample of a starting material (often referred to as a blank) are removed until the remaining portion of the starting material has the shape and size of the object. Subtractive manufacturing processes thus differ from additive manufacturing processes in that subtractive manufacturing processes start with a blank of material, which is precisely shaped by removing portions. One challenge introduced by subtractive manufacturing processes is how to keep the blank of material in a fixed position while portions are removed. Many subtractive manufacturing processes use physical contact between the blank and a tool (such as an end mill) to remove material from the blank. Forces exerted on the blank by the tool tend to move the blank unless the blank is firmly held in place.

In some cases, a special purpose fixture can be used to hold the blank in place during a machining process (e.g., to reduce or avoid instances of the part "slipping" during application of a mill, lathe, or other tool). However, design and fabrication of such fixtures for different parts increases cost and complexity associated with the machining process. For example, design and fabrication of a fixture to hold a blank during formation of a particular object can use the same or similar types of resources as design and fabrication of the object itself and can require a similar amount of time. As a result, cost and manufacturing delay are increased.

SUMMARY

In a particular example, a method of processor-aided design of a workholding frame for a manufacturing process includes using a processor to perform operations including receiving first data representing a first three-dimensional (3D) model of an object to be manufactured. The operations further include obtaining second data describing a second 3D model. The second 3D model represents a bounding box having one or more sides adjoining a surface of the object within the first 3D model. The operations further include automatically generating, based on the first data and the bounding box, third data indicating one or more parameters of the workholding frame. The workholding frame and the object are to be formed based on the one or more parameters and as a single workpiece from a blank material during a machining process associated with the object.

In another particular example, a system for design of a workholding frame for a manufacturing process includes a memory configured to store instructions. The system further includes a processor configured to receive first data representing a first 3D model of an object to be manufactured. The processor is further configured to obtain second data describing a second 3D model that represents a bounding box having one or more sides adjoining a surface of the object within the first 3D model. The processor is further configured to execute the instructions to automatically generate, based on the first data and the bounding box, third data indicating one or more parameters of the workholding frame. The workholding frame and the object are to be formed based on the one or more parameters and as a single workpiece from a blank material during a machining process associated with the object.

In another particular example, a computer-readable medium stores instructions executable by a processor to initiate, perform, or control operations to aid in design of a workholding frame for a manufacturing process. The operations include receiving first data representing a first 3D model of an object to be manufactured. The operations further include obtaining second data describing a second 3D model that represents a bounding box having one or more sides adjoining a surface of the object within the first 3D model. The operations further include automatically generating, based on the first data and the bounding box, third data indicating one or more parameters of the workholding frame. The workholding frame and the object are to be formed based on the one or more parameters and as a single workpiece from a blank material during a machining process associated with the object.

DETAILED DESCRIPTION

In a particular implementation, a processor is configured to design a workholding frame for an object to be manufactured using a machining process based on characteristics of the object. For example, in some implementations, the processor is configured to determine one or more parameters associated with the workholding frame based on a first three-dimensional (3D) model of the object to be manufactured and further based on a second 3D model indicating a bounding box associated with the object. In some examples, the second 3D model identifies a position of the first 3D model in a first space (e.g., a model space) to enable mapping of the position in the first space to a second space (e.g., a machine space). Alternatively or in addition, in some examples, the second 3D model specifies boundaries of the first 3D model in the second space to enable the boundaries to be extended to form dimensions of the workholding frame (e.g., a width of a channel between a portion of the object and the workholding frame).

In one example, after designing the workholding frame based on characteristics of the object, the workholding frame and the object are fabricated (e.g., machined) as a single, monolithic piece. After fabrication, the workholding frame can be separated (e.g., cut or broken) from the object. In one example, the workholding frame is connected to the object via a plurality of tabs that are cut or broken to separate the workholding frame from the object.

By performing processor-aided design of the workholding frame using the first 3D model and the second 3D model (e.g., a bounding box of the object), accuracy and efficiency of design of the workholding frame can be increased. As a particular illustrative example, the workholding frame can have one or more dimensions that are based on the bounding box indicated by the second 3D model. Alternatively or in addition, by fabricating the workholding frame and the object as a single, monolithic piece, expenditure of time and resources used to separately fabricate the workholding frame and the object are reduced. As an additional benefit, instances of the object "slipping" from the workholding frame during machining are reduced or avoided by manufacturing the object and the workholding frame as a single, monolithic piece (e.g., as compared to coupling the workholding frame to the object using fasteners).

Figure 1A:
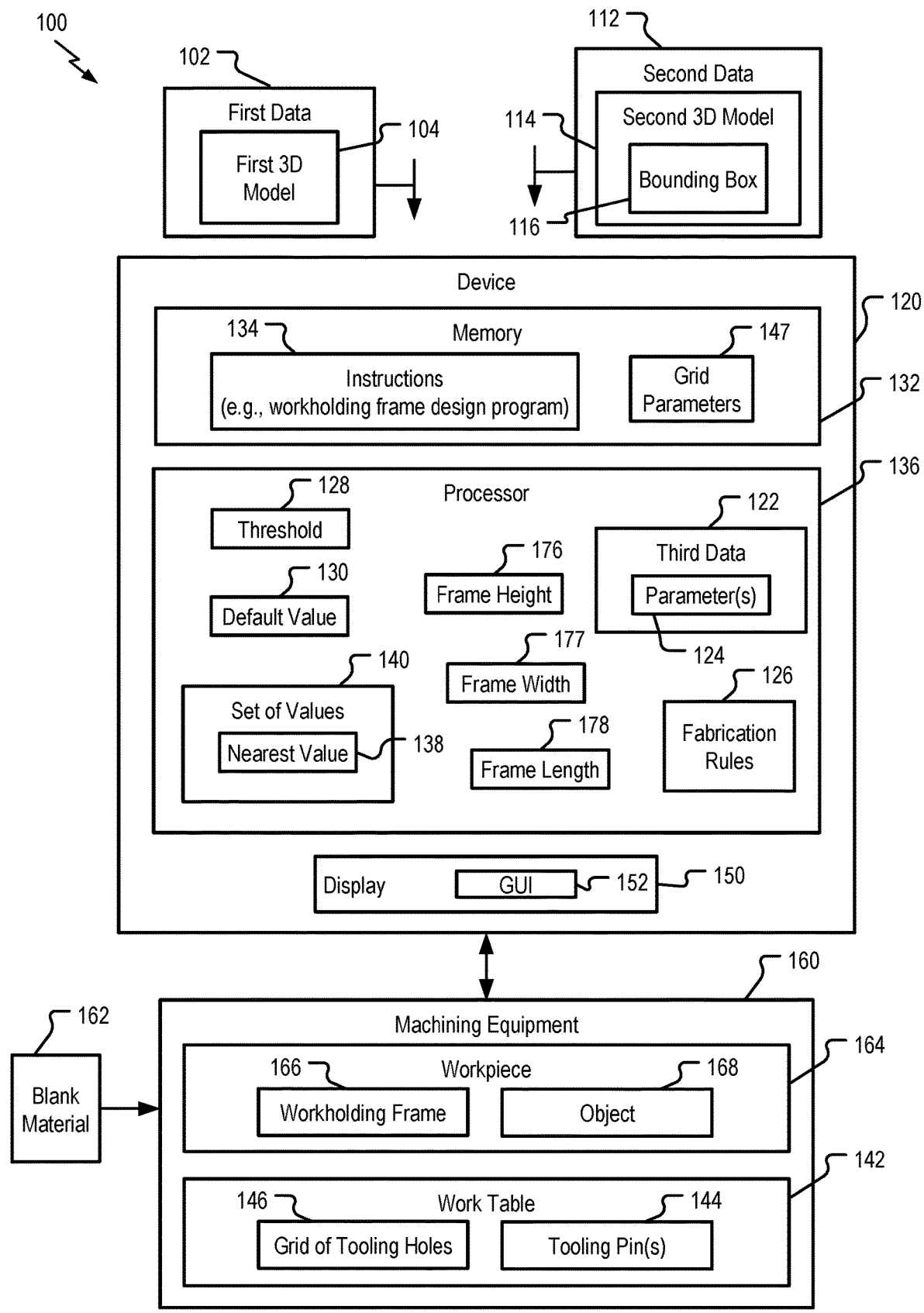
FIG. 1A is a diagram illustrating certain aspects of an example of a system that includes machining equipment and a device configured to perform processor-aided design of a workholding frame for a manufacturing process performed by the machining equipment.

Referring to FIG. 1A, a particular illustrative example of a system is depicted and generally designated 100. In the example of FIG. 1A, the system 100 includes a device 120 and machining equipment 160. In some implementations, the device 120 includes or corresponds to a computer (e.g., a server, a laptop computer, a desktop computer, or another computer).

The device 120 includes a memory 132. The memory 132 is configured to store instructions 134. In some implementations, the instructions 134 include or correspond to a workholding frame design program. The device 120 further includes a processor 136 coupled to the memory 132. The processor 136 is configured to retrieve the instructions 134 from the memory 132 and to execute the instructions 134 to initiate, perform, or control one or more operations described herein.

In some implementations, the device 120 includes a display 150. In some examples, the display 150 is configured to present a graphical user interface (GUI) 152.

In some implementations, the device 120 is coupled to the machining equipment 160 via a network. In one example, the network includes a wired connection, such as a bus connection or another wired connection. Alternatively or in addition, in some implementations, the device 120 and the machining equipment 160 are configured to communicate using a wireless connection.

The machining equipment 160 is configured to receive blank material 162 (e.g., a "block" of material) and to perform a manufacturing process to fabricate a workpiece 164. In the example illustrated in FIG. 1A, the machining equipment 160 includes a work table 142 or other structure that is configured to limit or prevent movement of the workpiece 164 during a machining operation. For example, the work table 142 can include a plurality of tooling holes arranged in a grid (e.g., a grid of tooling holes 146). In this example, one or more tooling pins 144 can be disposed in particular tooling holes of the grid of tooling holes 146 to retain the workpiece 164.

In some implementations, the device 120 stores information related to the machining equipment 160, such as the work table 142. To illustrate, in the example of FIG. 1, the memory 132 stores grid parameters 147 associated with the work table 142. In some implementations, the grid parameters 147 are associated with the grid of tooling holes 146, the one or more tooling pins 144, one or more other characteristics of the work table 142, or a combination thereof. In a particular example, the grid parameters 147 indicate one or more of a tooling hole diameter of tooling holes of the grid of tooling holes 146 or a spacing (e.g., distance between) tooling holes of the grid of the tooling holes 146.

In a particular example, the workpiece 164 includes a workholding frame 166 and an object 168 (e.g., a component of a vehicle, as a non-limiting, illustrative example). The workholding frame 166 can include one or more tooling holes (illustrated in FIGS. 1G and 1H) that are arranged (e.g., sized and spaced apart) to align with tooling holes of the grid of tooling holes 146 to receive the one or more tooling pins 144. In a particular example, the machining equipment 160 is configured to form the workholding frame 166 and the object 168 from the blank material 162 during a machining process.

In some examples, the machining equipment 160 is configured to operate in accordance with fabrication rules 126. For example, in some implementations, fabrication rules 126 specify target distances between features of the workpiece 164 or tolerance ranges associated with features of the workpiece 164. In some implementations, indications of the fabrication rules 126 are provided to the processor 136.

During operation, the processor 136 is configured to receive first data 102 associated with the object 168. To illustrate, in some implementations, the device 120 receives the first data 102 via user input (e.g., via the GUI 152), via a network, via a memory device (e.g., a removable memory drive), using another technique, or a combination thereof. In some implementations, the first data 102 includes a computer-assisted drawing (CAD) file, such as a 3D wireframe CAD file or a 3D solid model CAD file, as illustrative examples.

The first data 102 represents a first three-dimensional (3D) model 104 of the object 168. In some examples, the first 3D model 104 is a boundary representation (B-REP) solid model of the object 168 and complies with a standard for the exchange of product model data (STEP) file format. In another implementation, the first data 102 has a stereolithography (STL) file format. In some implementations, the first data 102 represents the object 168 as a triangulated mesh (e.g., a mesh of triangles used to represent surfaces of an object). In other implementations, other file formats are used.

The processor 136 is further configured to obtain second data 112. To illustrate, in some implementations, the device 120 receives the second data 112 via user input (e.g., via the GUI 152 during execution of a design program corresponding to the instructions 134), via a network, via a memory device (e.g., a removable memory drive), using another technique, or a combination thereof. Alternatively, the device 120 can generate the second data 112 based on the first data 102 (e.g., based on the particular dimensions of the object 168 indicated by the first data 102, such as described further with reference to FIG. 2).

The second data 112 describes a second 3D model 114. The second 3D model 114 represents a bounding box 116 of the object 168 having a side adjoining a surface of the object 168 within the first 3D model 104. In some implementations, the bounding box 116 is a polyhedron. In some implementations, the processor 136 is configured to generate the second 3D model 114 based on one or more characteristics of the object 168 indicated by the first 3D model 104. An illustrative example of a method that can be performed to generate the second data 112 is described further with reference to FIG. 2.

In some examples, the second 3D model 114 identifies a position of the first 3D model 104 in a first space (e.g., a model space) to enable mapping of the position in the first space to a second space (e.g., a machine space associated with the machining equipment 160). To illustrate, in some cases, a first coordinate system associated with the first space may differ from a second coordinate system associated with the second space. In this case, the second 3D model 114 can indicate one or more dimensions of the object 168 in the second space using the second coordinate system (e.g., instead of using the first coordinate system associated with the first space). Alternatively or in addition, in some examples, the second 3D model 114 specifies boundaries of the first 3D model 104 in the second space to enable the boundaries to be extended to form dimensions of the workpiece 164.

Figure 1B:
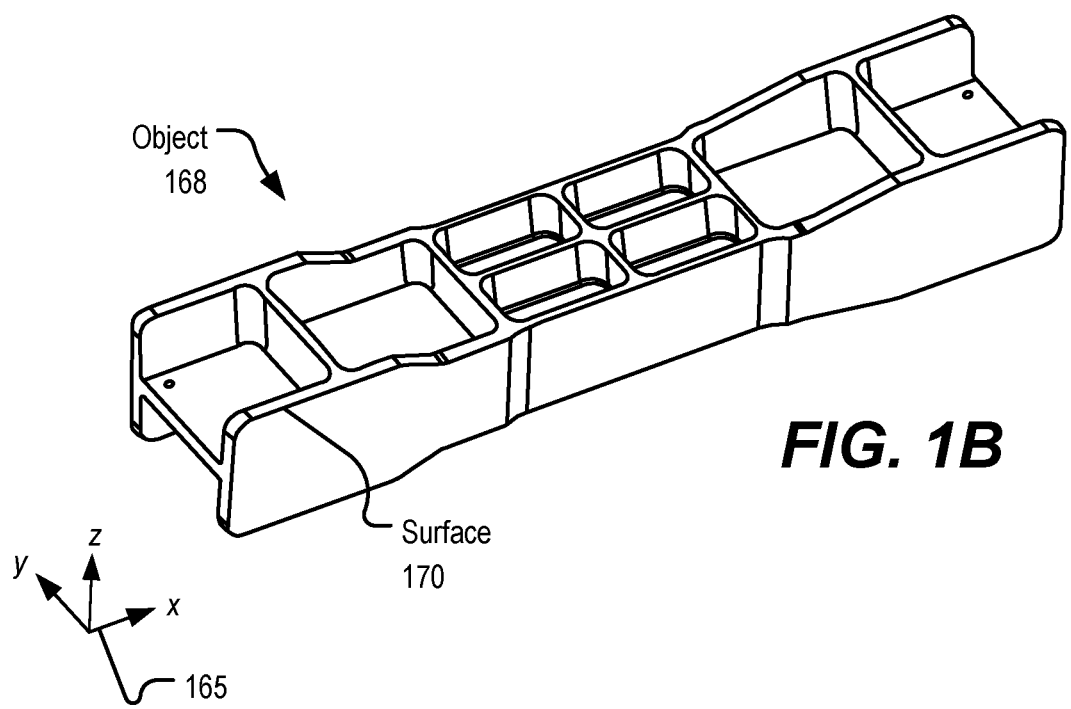
FIG. 1B is a diagram illustrating aspects of an example of an object manufactured by the machining equipment of FIG. 1A.

To further illustrate, FIG. 1B depicts a particular example of the object 168. In the example of FIG. 1B, the object 168 has features represented by the first 3D model 104. As a particular example, the example of FIG. 1B depicts that the object 168 has a surface 170 that is represented within the first 3D model 104. Alternatively or in addition, one or more other features of the object 168 can be specified by the first 3D model 104 (e.g., using a first coordinate system 165). The first coordinate system 165 is determined by a designer of the object 168 or a 3D modeling or rendering software application used to generate the first 3D model 104 representing the object 168. In some implementations, the position and orientation of the first 3D model 104 representing the object 168 in the first coordinate system 165 is arbitrary. To manufacture the workpiece 164 of FIG. 1A using the machining equipment 160, the position and orientation of the object 168 are mapped into a second coordinate system 167 (illustrated in FIG. 1C) by determining a bounding box 116 in the second coordinate system 167 that encloses the object 168 in a specified manner.

Figure 1C:
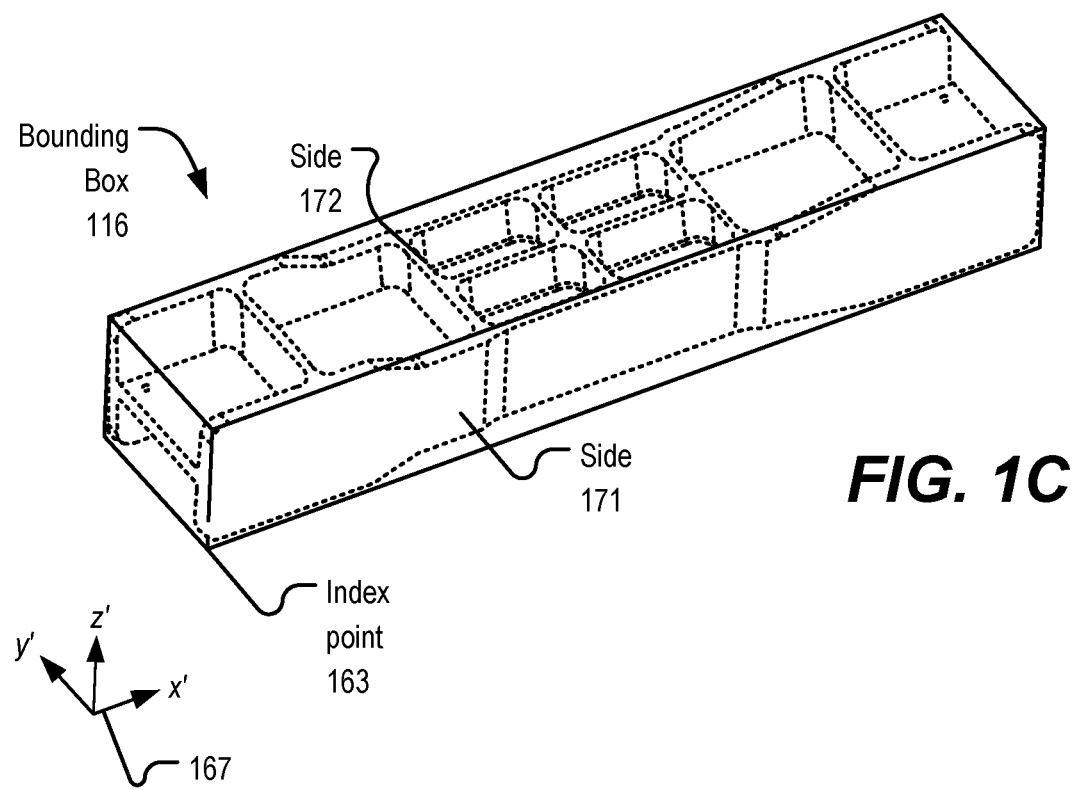
FIG. 1C is a diagram illustrating aspects of an example of a bounding box associated with the object of FIG. 1B.

FIG. 1C depicts certain aspects associated with an example of the bounding box 116 (e.g., a bounding box associated with the example of the object 168 illustrated in FIG. 1B). In FIG. 1C, aspects of the object 168 are shown in dashed lines within the bounding box 116 for purposes of illustration (e.g., to illustrate how the bounding box 116 bounds the object 168 in the example of FIG. 1C). In a particular example, the bounding box 116 corresponds to a bounding box enclosing the object 168 in a geometrical space (e.g., a second space that is different from a first space associated with the first 3D model 104) associated with a second coordinate system 167. For example, when the bounding box 116 is a rectangular prism having six sides, the three orthogonal dimensions of the rectangular prism, e.g., a height and width of a first side and a length of a side adjacent to the first side, are selected such that each side touches (e.g., intersects) a feature of the object 168. In the example of FIG. 1C, the bounding box 116 has a side 171 and a side 172 that adjoin the surface 170. In some examples, the second space corresponds to or has a known relationship to positions on the work table 142 of FIG. 1A.). For example, a particular location on the bounding box 116 can be used as an index point 163 that has a known position in the second coordinate system 167. To illustrate, the processor 136 of FIG. 1A can determine the location of the index point 163 relative to a known point on the work table 142, such as a home location of the machining equipment 160.

Figure 1D:
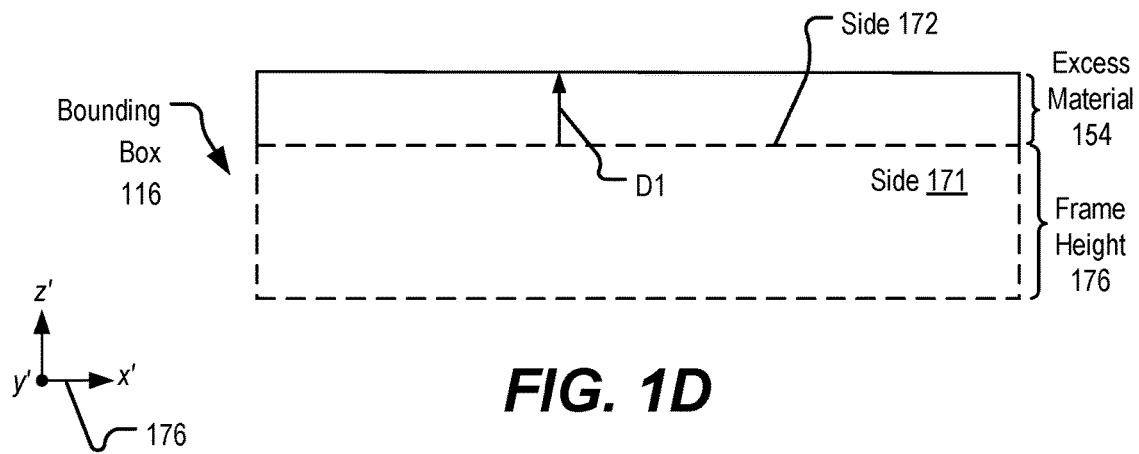
FIG. 1D is a diagram illustrating aspects of an example of a workholding frame that is designed based on the bounding box of FIG. 1C.
Figure 1E:
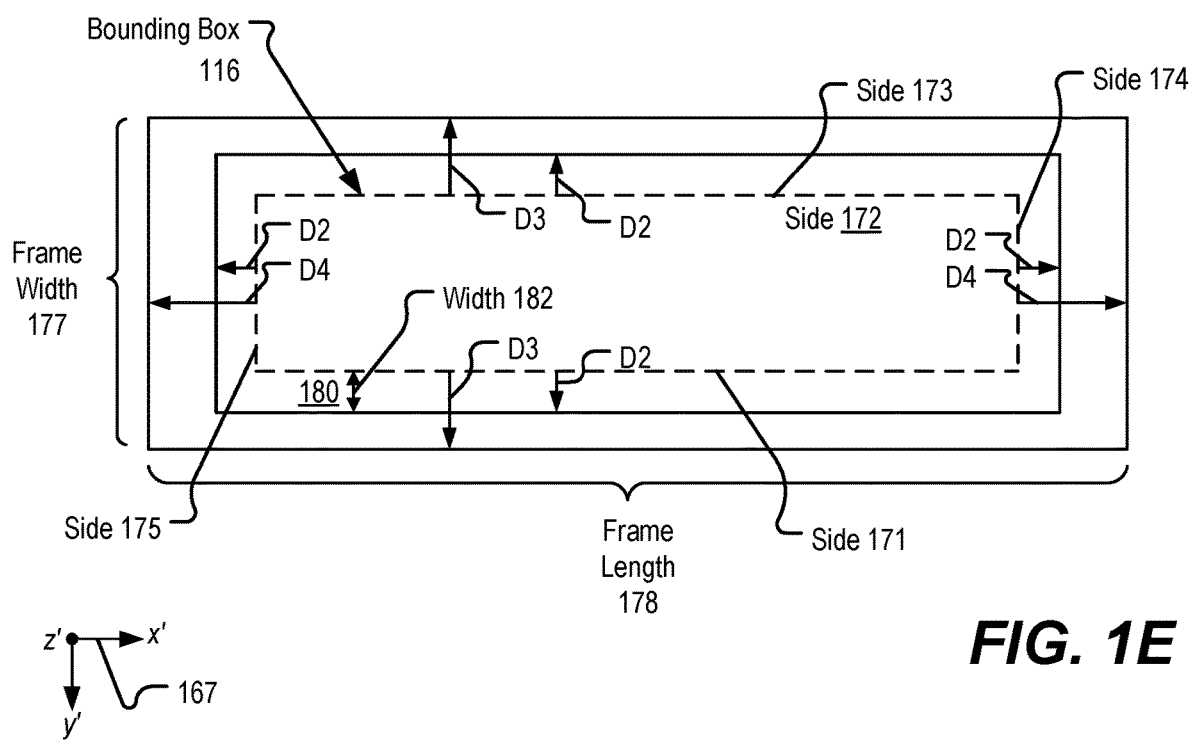
FIG. 1E is a diagram illustrating additional aspects of an example of the workholding frame of FIG. 1D.

FIGS. 1D and 1E illustrate aspects of a model of the workholding frame 166. In FIG. 1D, aspects of the bounding box 116 are shown in dashed lines within the workholding frame 166 for purposes of illustration. In some implementations, the processor 136 is configured to determine one or characteristics of the workholding frame 166 based on the bounding box 116 (e.g., by shifting or moving one or more dimensions of the bounding box 116 to determine one or more dimensions of the workholding frame 166). To illustrate, FIG. 1D depicts a side view of the bounding box 116 and shows moving the side 172 (during design of the workholding frame 166 by the processor 136) upward (or in the z' direction) based on a first offset distance D1 to provide excess material 154 (extending beyond a frame height 176 of the workholding frame 166) that can be removed to provide a flat surface of the workpiece 164 (e.g., to ensure that at least one surface of the workpiece 164 lies flat against the work table 142 during machining).

FIG. 1E shows a top view of the bounding box 116. In FIG. 1E, one or more dimensions of the bounding box 116 are shifted or moved to determine one or more dimensions of the workholding frame 166. For example, in FIG. 1E, sides and ends of the bounding box 116 are moved in the y' and x' directions, respectively. In the example of FIG. 1E, sides 174, 175 of the bounding box 116 are moved by a second offset distance D2 in the y' direction to define a width 182 of a channel 180 (e.g., a space between the workholding frame 166 and the object 168), and then moved again (by a third offset distance D3) to define a frame width 177 of the workholding frame 166. In the example of FIG. 1E, the side 171 and a side 173 of the bounding box 116 are moved by the second offset distance D2 in the x' direction to define a channel width (e.g., the width 182 or a different width), and then moved again (by a fourth offset distance D4) to define a frame length 178 of the workholding frame 166 and to provide room for tooling holes, as described further below. For example, in some implementations, the fourth offset distance D4 is based on a length of the object 168, the spacing between tooling holes of the grid of tooling holes 146 of the work table 142 of FIG. 1A, the size of the tooling holes of the grid of tooling holes 146, and the size of available blanks or a minimum thickness of a frame wall. In some examples, a tooling hole (e.g., a tooling hole 188 shown in FIG. 1G) of the workholding frame 166 is sized and positioned based on spacing of the tooling holes or tooling pins 144 of the work table 142 (shown in FIG. 1A) so that the tooling hole of the workholding frame 166 aligns with a tooling pin 144 in a tooling hole of the work table 142. The wall thickness of the frame wall can be selected (e.g., based on structural characteristics of the frame wall, such as rigidity) to retain the object 168 without breaking when a bit of the machining equipment 160 cuts the blank material 162.

Figure 1F:
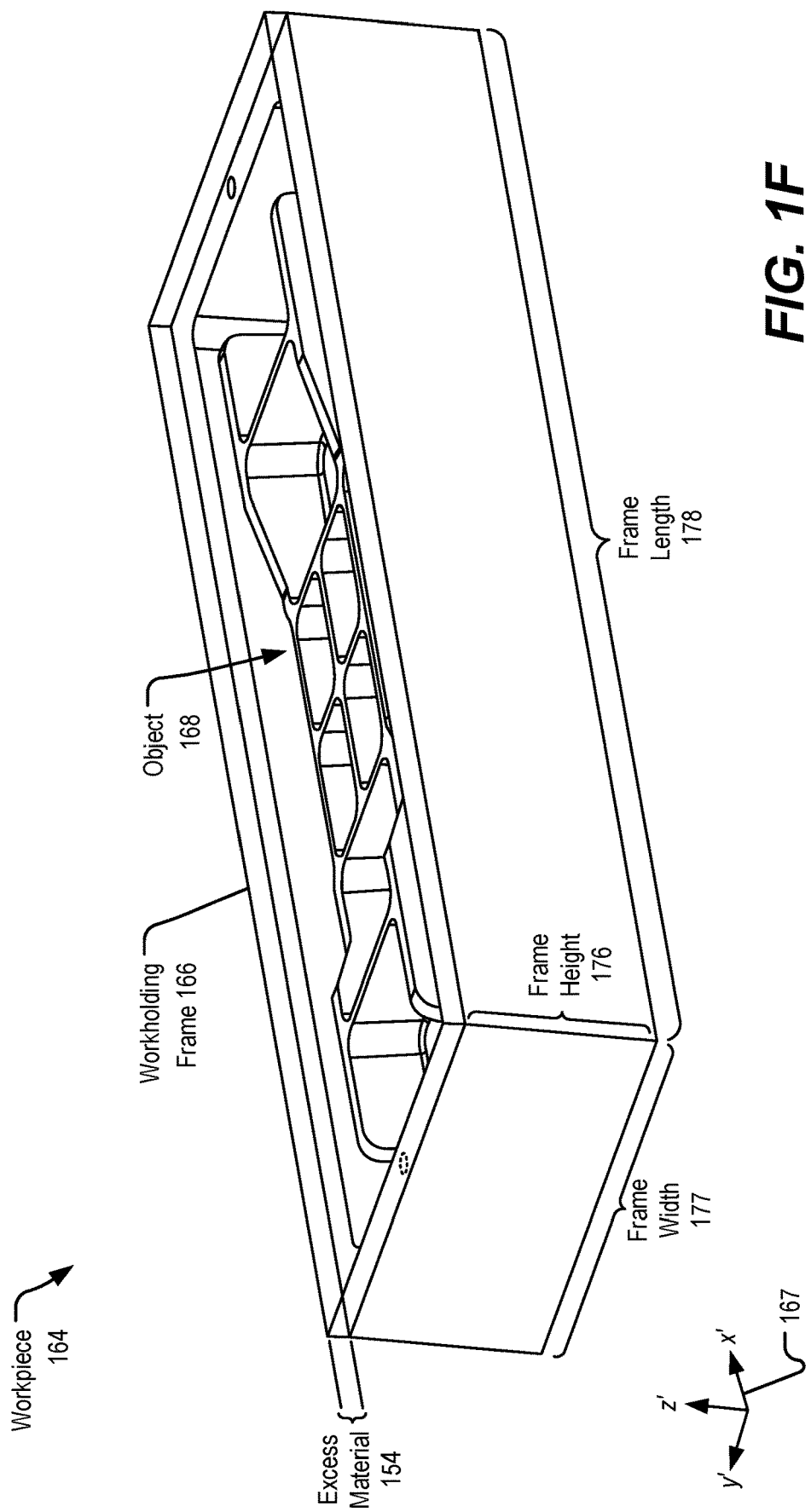
FIG. 1F is a diagram illustrating additional aspects of an example of the workholding frame of FIG. 1D.
Figure 1G:
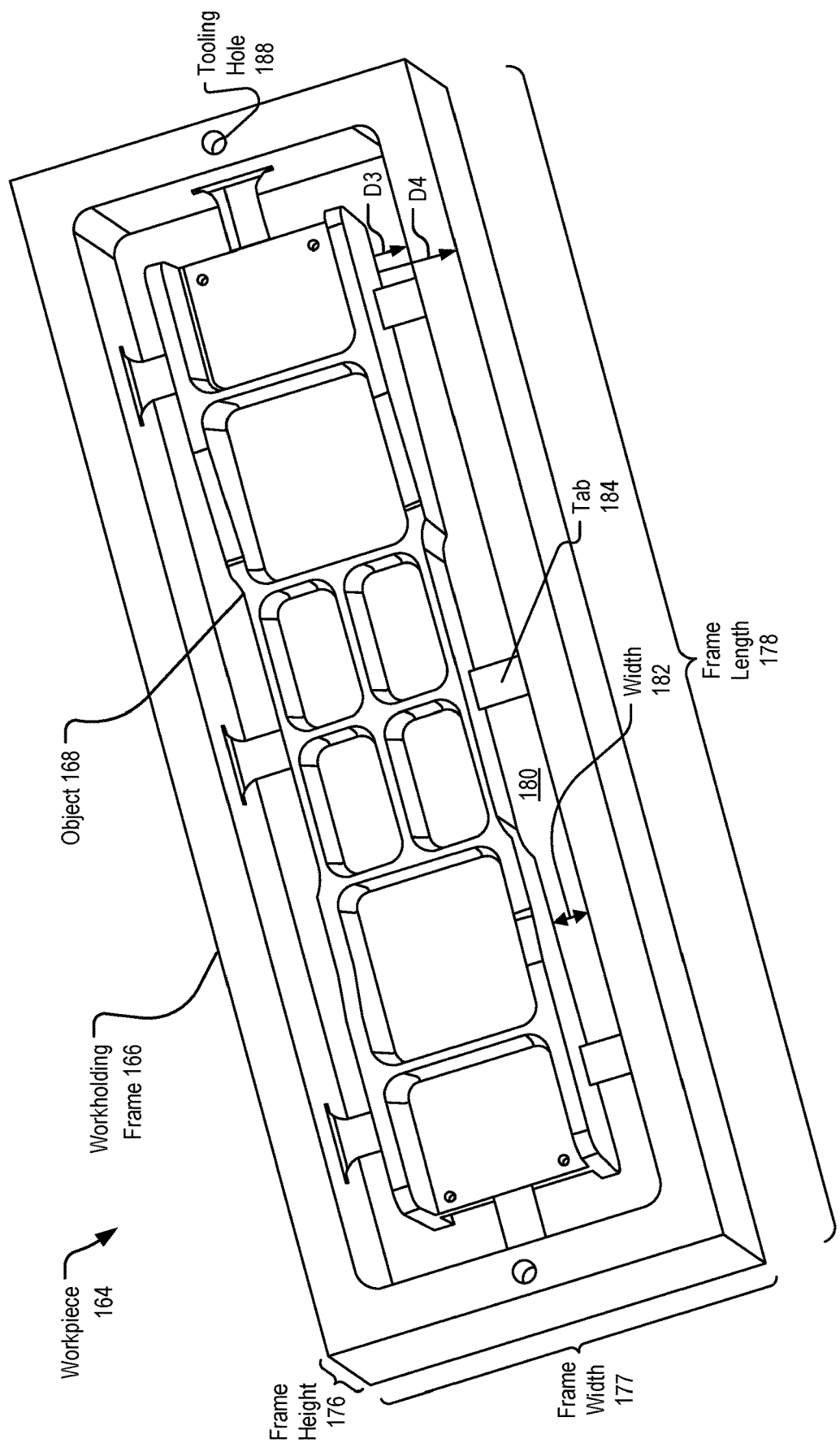
FIG. 1G is a diagram illustrating additional aspects of an example of the workholding frame of FIG. 1D.

FIG. 1F depicts an example of the workpiece 164. For example, in some implementations, the workpiece 164 of FIG. 1F is fabricated by the machining equipment 160 (shown in FIG. 1A) from the blank material 162.

The processor 136 of FIG. 1A is configured to execute the instructions 134 to automatically generate, based on the first data 102 and the second data 112, third data 122. The third data 122 indicates one or more parameters 124 of the workholding frame 166. In some examples, the third data 122 indicates parameters such as one or more of the frame height 176 of the workholding frame 166, the frame length 178 of the workholding frame 166, or the frame width 177 of the workholding frame 166. The parameters can also include values representing other features or dimensions of the workholding frame 166. To illustrate, the parameters can indicate locations and dimensions of tooling holes of the workholding frame 166, locations and dimensions of tabs that attach the object 168 to the workholding frame 166, other dimensions used to guide the machining equipment 160 while forming the object 168 and the workholding frame 166, or a combination thereof.

In one example, the processor 136 is configured to automatically generate, during design of the workholding frame 166 and based on the bounding box 116, data associated with the workholding frame 166 by shifting or moving one or more dimensions or features of the bounding box 116. In one example, the processor 136 is configured to automatically generate the third data 122 by shifting one or more sides of the second 3D model 114 to be offset along a first direction (e.g., the z' direction) by the first offset distance D1. For example, as illustrated in FIG. 1D, the side 172 of the bounding box 116 is shifted based on the first offset distance D1. In some examples, the processor 136 is configured to select the first offset distance D1 to provide the excess material 154 (shown in FIG. 1D) that can be removed to planarize a surface of the blank material 162. The processor 136 is also configured to automatically generate the third data 122 by shifting the one or more sides (e.g., the side 172) of the bounding box 116 to be offset, in the first direction (e.g., the z' direction), by the second offset distance D2 to define the frame height 176 of the workholding frame 166. The frame height 176 is greater than the height of the object 168 to be formed and is less than the height of the blank material 162 by a difference between the first offset distance D1 and the second offset distance D2.

In some examples, the processor 136 is configured to automatically generate the third data 122 by shifting one or more other sides (e.g., the side 171) by the third offset distance D3, as illustrated in the example of FIG. 1E. In some examples, the processor 136 is configured to determine the third offset distance D3 based on one or more criteria associated with the workpiece 164, one or more criteria associated with the machining process, or a combination thereof. To illustrate, the third offset distance D3 can be selected to define the width 182 (shown in FIGS. 1E and 1G) of the channel 180 to be formed between the object 168 and the workholding frame 166 by the machining process. The channel 180 (e.g., a cavity region) separates the workholding frame 166 and the object 168. In a particular implementation, the width 182 is based on capabilities of the machining process indicated by the fabrication rules 126. For example, when the machining process includes a milling operation using a cutting bit, the width 182 is at least as wide as a diameter of the cutting bit. The processor 136 can select the width 182 during design of the workholding frame 166 (e.g., so that the width 182 is greater than the diameter of the cutting bit due to tolerances of the machining operation or to allow for multiple cutting passes of the cutting bit to properly define a shape of the object 168, to define tabs 184 between the object 168 and the workholding frame 166, etc.).

The processor 136 is also configured to automatically generate the third data 122 by shifting the one or more other sides (e.g., by increasing a length of the side 171) by the fourth offset distance D4 to define a frame width. In some examples, the processor 136 is configured to determine the fourth offset distance D4 based on one or more criteria associated with the workpiece 164, one or more criteria associated with the machining process, or a combination thereof.

Alternatively or in addition, in some examples, the processor 136 is configured to determine the frame width 177 based on the frame height 176 (shown in FIG. 1F). To illustrate, in one example, the processor 136 is configured to automatically generate the third data 122 by determining whether the frame height 176 is less than or equal to a threshold, such as a threshold 128 of FIG. 1A. In one example, in response to the frame height 176 failing to satisfy (e.g., being less than or equal to) the threshold 128, the processor 136 is configured to determine the frame width 177 based on a default value 130 (e.g., by adjusting the frame width 177 to be equal to the default value 130). In some examples, the default value 130 is based on one or more of a material type or a composition of the blank material 162. In some examples, in response to the frame height 176 satisfying (e.g., being greater than) the threshold 128, the processor 136 is configured to determine the frame width 177 based on (e.g., as a function of) the frame height 176. As a particular illustrative example, in some implementations, the processor 136 is configured to determine the frame width 177 by multiplying the frame height 176 by a particular value (e.g., 0.25, as a non-limiting example).

In some examples, the processor 136 is configured to round the frame width 177 to a nearest value 138, shown in FIG. 1A, (e.g., after determining the frame width 177 based on the default value 130 or based on the frame height 176), such as by rounding the frame width 177 up to a nearest increment (e.g., by rounding the frame width 177 up to a nearest increment). In some implementations, the nearest increment corresponds to a closest available blank size of a set of blank materials that includes the blank material 162. In this example, the frame width 177 can be selected based on the frame height 176 and then rounded up based on the nearest available blank size. In some implementations, blank sizes are available in increments of ¼ inches (e.g., 1 inch, 1.25 inches, 1.5 inches, etc.). In other implementations, different blank sizes can be used.

To further illustrate, in one example, the nearest value 138 is greater than the frame width 177 and is included in a particular set of values 140 (e.g., a set of incremental values corresponding to a range of available blank sizes). To illustrate, in some examples, the particular set of values includes increments of 0.25 (e.g., 1.00, 1.25, 1.50, 1.75, 2.00, etc.). In this example, if the frame width 177 is equal to 1.63, then the nearest value 138 corresponds to 1.75, and the processor 136 is configured to round to the frame width 177 to 1.75. Alternatively in some examples, the processor 136 is configured to automatically generate the third data 122 by determining the frame length 178 based on one or more characteristics of the workpiece 164, such as one or more characteristics of the tooling hole 188 of the workholding frame 166.

Figure 1H:
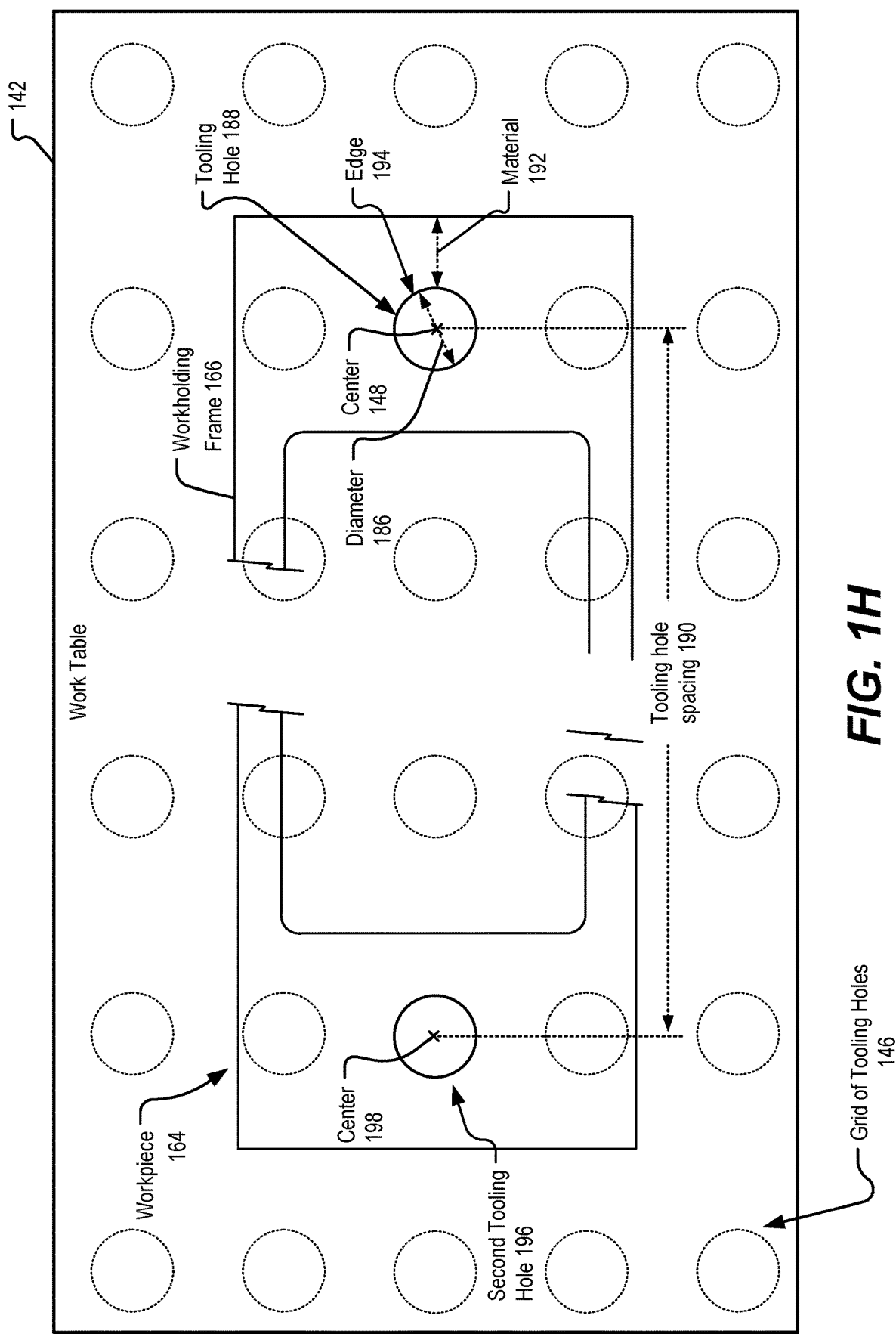
FIG. 1H is a diagram illustrating additional aspects of an example of the workholding frame of FIG. 1D.

To further illustrate, FIG. 1H depicts certain aspects of a particular example of the workpiece 164 and the work table 142. In the example of FIG. 1H, a center 148 and a diameter 186 of the tooling hole 188 are shown. FIG. 1H also illustrates a second tooling hole 196 and the center 198 of the second tooling hole 196. The tooling holes 188, 196 are spaced apart by a tooling hole spacing 190. In FIG. 1H, the tooling hole spacing 190 corresponds to the distance between the centers 148, 198 of the tooling holes 188, 196. The tooling hole spacing 190 is selected to such that each of the tooling holes 188, 196 can be aligned with a respective tooling hole of the grid of tooling holes 146 (of FIG. 1A). For example, the tooling hole spacing 190 is an integer multiple of a spacing between tooling holes of the grid of tooling holes 146 of the work table 142. The diameter 186 of the tooling hole 188 is selected to enable the tooling hole 188 to receive a tooling pin of the one or more tooling pins 144 of FIG. 1A. In some implementations, the processor 136 is configured to determine the frame length 178 based on one or more of the diameter 186, the tooling hole spacing 190, or the material 192 (e.g., based on a structural rigidity of the material 192). In some implementations, the grid parameters 147 of FIG. 1A specify one or more of the diameter 186 or the tooling hole spacing 190.

FIG. 1H also shows an illustrative example of the grid of tooling holes 146 of the work table 142. In some implementations, the grid of tooling holes 146 and the one or more tooling pins 144 of FIG. 1 (not shown in FIG. 1H) keep at least a portion of the workpiece 164 in contact with the work table 142 during a machining process. To illustrate, in one example, a particular tooling pin 144 is configured to engage both the tooling 188 and a corresponding tooling hole of the grid of tooling holes 146 (e.g., so that the workpiece 164 is held in place during the machining process).

Referring again to FIG. 1A, in some implementations, the device 120 is configured to provide data (e.g., any of the first data 102, the second data 112, and the third data 122) to the machining equipment 160 (e.g., via a wired connection or a wireless connection). As a particular example, in some implementations, the machining equipment 160 includes or is coupled to a controller and a memory. In some examples, the memory is configured to receive the third data 122 from the device 120. In some implementations, the memory is configured to receive the first data 102 (e.g., from the device 120 or from another source).

In a particular example, the machining equipment 160 is configured to fabricate the workpiece 164 based on the first data 102 and the third data 122. The workholding frame 166 and the object 168 are fabricated (e.g., machined) as a single, monolithic piece. To illustrate, the workpiece 164 corresponds to a single, monolithic piece in which the workholding frame 166 and the object 168 are integrated.

In some examples, the machining equipment 160 includes one or more cutting tools (e.g., an end mill) configured to form the workpiece 164 from the blank material 162 based on the first data 102 and the third data 122 using a subtractive manufacturing process. Alternatively or in addition, in some examples, the machining equipment 160 includes a computer numerical control (CNC) machine, a rapid prototyping (RP) machine, an additive manufacturing (AM) machine, a subtractive manufacturing machine, one or more other machines, or a combination thereof.

In some implementations, the blank material 162 includes a metal material (e.g., aluminum as an illustrative example). Alternatively or in addition, in some implementations, the blank material 162 includes one or more other materials, such as a wood material, a plastic material, a ceramic material, one or more other materials, or a combination thereof.

In some examples, the workholding frame 166 is separated from the object 168 after completion of a machining process by the machining equipment 160. To illustrate, in the example of FIG. 1F, the workholding frame 166 includes one or more tabs (e.g., a representative tab 184) that attach the workholding frame 166 to the object 168. After completion of a machining process by the machining equipment 160, in some examples, the workholding frame 166 is separated from the object 168 using the one or more tabs (e.g., by cutting or breaking the one or more tabs). In some implementations, the one or more tabs are broken or cut using a rotary tool, a saw, a file, another device, or a combination thereof.

By performing processor-aided design of the workholding frame 166 using the first 3D model 104 and the second 3D model 114, accuracy and efficiency of design of the workholding frame 166 can be increased. As a particular illustrative example, the workholding frame 166 can have dimension that are based on the bounding box 116 indicated by the second 3D model 114. Alternatively or in addition, by fabricating the workholding frame 166 and the object 168 as a single, monolithic piece, expenditure of time and resources used to separately fabricate the workholding frame 166 and the object 168 are reduced. As an additional benefit, instances of the object 168 "slipping" from the workholding frame 166 during machining are reduced or avoided by manufacturing the object 168 and the workholding frame 166 as a single, monolithic piece (e.g., as compared to coupling the workholding frame 166 to the object 168 using fasteners).

Figure 2:
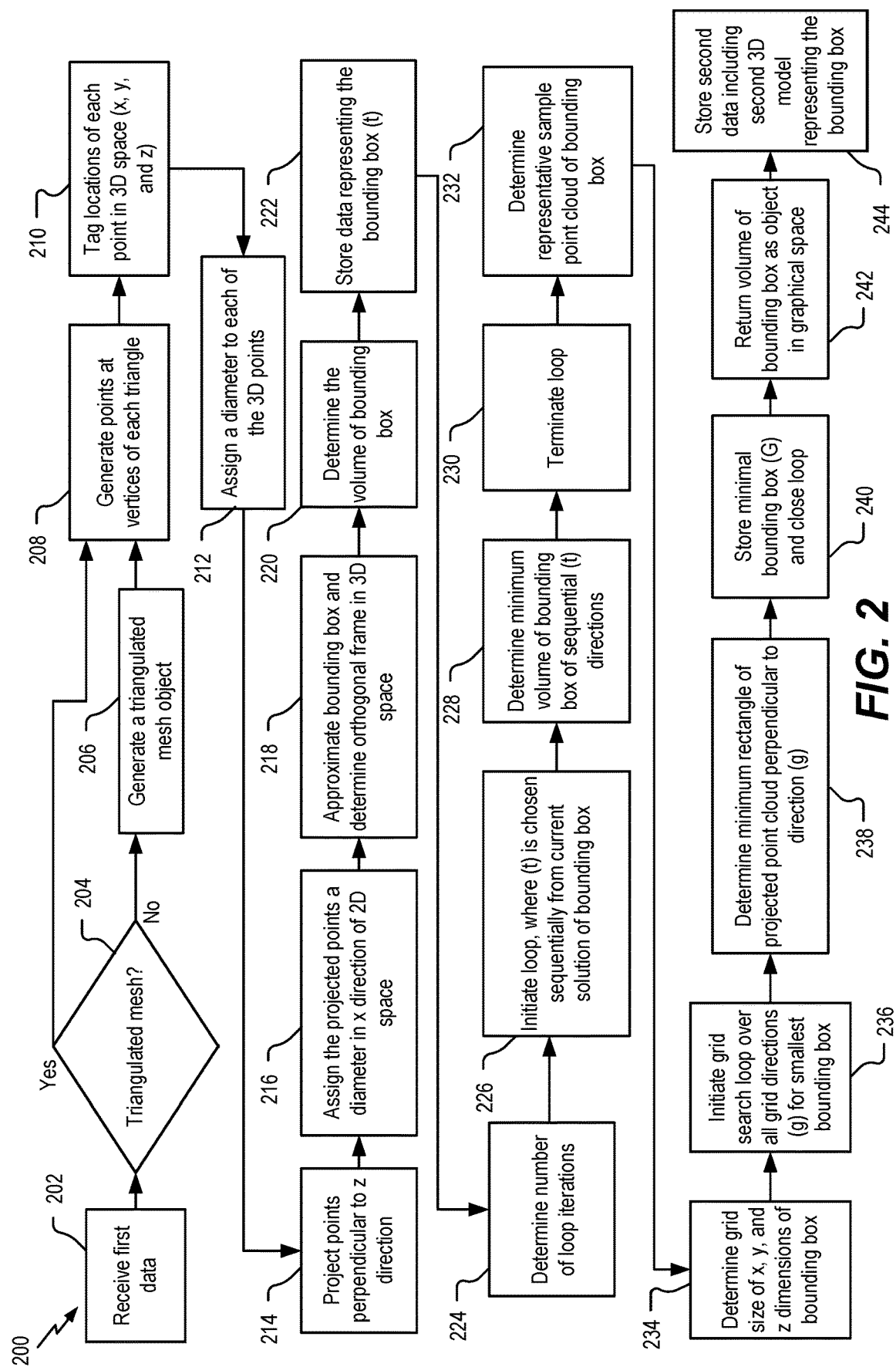
FIG. 2 is a diagram of an example of a method of operation of the device of FIG. 1A.

Referring to FIG. 2, a particular illustrative example of a method is depicted and generally designated 200. In a particular implementation, operations of the method 200 are initiated, performed, or controlled by the processor 136, such as by executing the instructions 134. In some examples, the processor 136 is configured to perform the method 200 to generate the second data 112 based on the first data 102.

The method 200 includes receiving first data, at 202. In one example, the device 120 of FIG. 1A receives the first data 102 representing the first 3D model 104. In some implementations, the first data 102 includes a CAD file representing the first 3D model 104. Alternatively, in other cases, the first 3D model 104 is of another file type.

In some examples, the method 200 further includes determining whether the first data indicates a triangulated mesh (e.g., a mesh of triangles used to represent surfaces of an object), at 204. In response to determining that the first data does not indicate a triangulated mesh, the method 200 further includes generating a triangulated mesh object, at 206. For example, in some implementations, the processor 136 is configured to determine a CAD model based on the first data 102 (in cases where the first data 102 does not include a CAD file representing the first 3D model 104). In some examples, the CAD model represents the object 168 using a triangulated mesh. Alternatively, in response to determining that the first data indicates a triangulated mesh, the method 200 further includes generating points at vertices of each triangle of the triangulated mesh, at 208. For example, the points at the vertices of each triangle can be specified by a particular file type, such as a CAD file type. To further illustrate, as described above with reference to FIG. 1A, the object 168 can be represented using one or more files having a 3D wireframe CAD file format, a 3D solid model CAD file format, a B-REP solid model file format, a STEP file format, an STL file format, or another file format, as illustrative examples.

The method 200 further includes tagging locations of each point in a 3D space, at 210. For example, in some implementations, each point is identified using coordinates of a coordinate system, such as a Cartesian coordinate system.

The method 200 further includes assigning a diameter to each of the 3D points, at 212. In a particular example, each of the 3D points is assigned a particular diameter, such as a diameter associated with a CAD file type or a particular manufacturing process, as illustrative examples.

The method 200 further includes projecting points perpendicular to the z direction, at 214. For example, in some implementations, each of the points is projected from the 3D space to a plane of a 2D space, such as using a mathematical projection technique that converts coordinates of a three-dimensional coordinate system to coordinates of a two-dimensional coordinate system.

The method 200 further includes assigning the projected points a diameter in a particular direction of the 2D space, at 216. In a particular example, the diameters of the projected points are projected in the x direction of the 2D space.

The method 200 further includes approximating a bounding box and determining an orthogonal frame in the 3D space, at 218. For example, in some implementations, the bounding box corresponds to the bounding box 116 of FIG. 1A. In some examples, the bounding box is based on the projected points in the x direction (e.g., of the first coordinate system 165 of FIG. 1B) of the 2D space (e.g., by interpolating points in the x direction to determine a dimension of the bounding box).

The method 200 further includes determining the volume of at least one bounding box, at 220. For example, in some implementations, the volume of the bounding box is determined based on length, width, and height of the bounding box 116.

The method 200 further includes storing data representing the bounding box, at 222. For example, in some implementations, the data indicates a preliminary shape or set of dimensions associated with the second 3D model 114, such as a preliminary shape or dimensions of the bounding box 116.

The method 200 further includes determining a number of loop iterations, at 224. In some implementations, the number of loop iterations is specified by user input that is received via the GUI 152. In a particular example, a greater number of loop iterations is used to refine dimensions of the second 3D model 114, or a reduced number of loop iterations is used to increase computation speed.

The method 200 further includes initiating a loop, at 226. In a particular example, the loop is initiated using the preliminary shape or parameters of the bounding box 116 as initial parameters for operations specified by the loop.

The method 200 further includes determining a desired (e.g., minimum) volume of the bounding box using sequential directions, at 228. For example, in some implementations, the desired volume is determined using one or more techniques described herein, such as one or more techniques used to determine length, width, and height of the bounding box 116.

The method 200 further includes terminating the loop, at 230. For example, in some implementations, the loop is terminated in response to reaching the number of loop iterations.

The method 200 further includes determining a representative point cloud of the bounding box, at 232. For example, in some implementations, the point cloud corresponds to sample points of the bounding box.

The method 200 further includes determining a grid size of the bounding box in the x, y, and z dimensions, at 234. The method 200 also includes initiating a grid search loop over all grid directions for the smallest size of the bounding box, at 236, and determining a minimum rectangle of the projected point cloud perpendicular to a particular direction, at 238.

The method 200 further includes storing data representing the bounding box and closing the loop, at 240. The method 200 further includes returning the volume of the bounding box as an object in a graphical space, at 242, and storing second data including a second 3D model representing the bounding box, at 244. In a particular example, the processor 136 stores the second data 112 representing the second 3D model 114 to the memory 132 of FIG. 1A.

By generating second data representing the bounding box as described with reference to the method 200 of FIG. 2, accuracy and efficiency of design of the workholding frame 166 can be increased. As a particular illustrative example, in some implementations, the processor 136 of FIG. 1A is configured to determine dimension of the workholding frame 166 using the second data representing the bounding box. In some implementations, the second data represents a minimum bounding box, which, as used herein, refers to a smallest bounding box identified by the method 200 to fully enclose the representation of the object 168 in the first 3D model 104 (shown in FIG. 1A). Although the method 200 is designed to identify the smallest possible bounding box to fully enclose the representation of the object 168, in some implementations, the smallest bounding box identified by the method 200 may not be the smallest possible bounding box (e.g., the global minimum bounding box), for example due to limitations in processing resources. In other implementations, other arrangements are possible, such as a bounding box that is not the smallest and includes a sacrificial layer.

Figure 3:
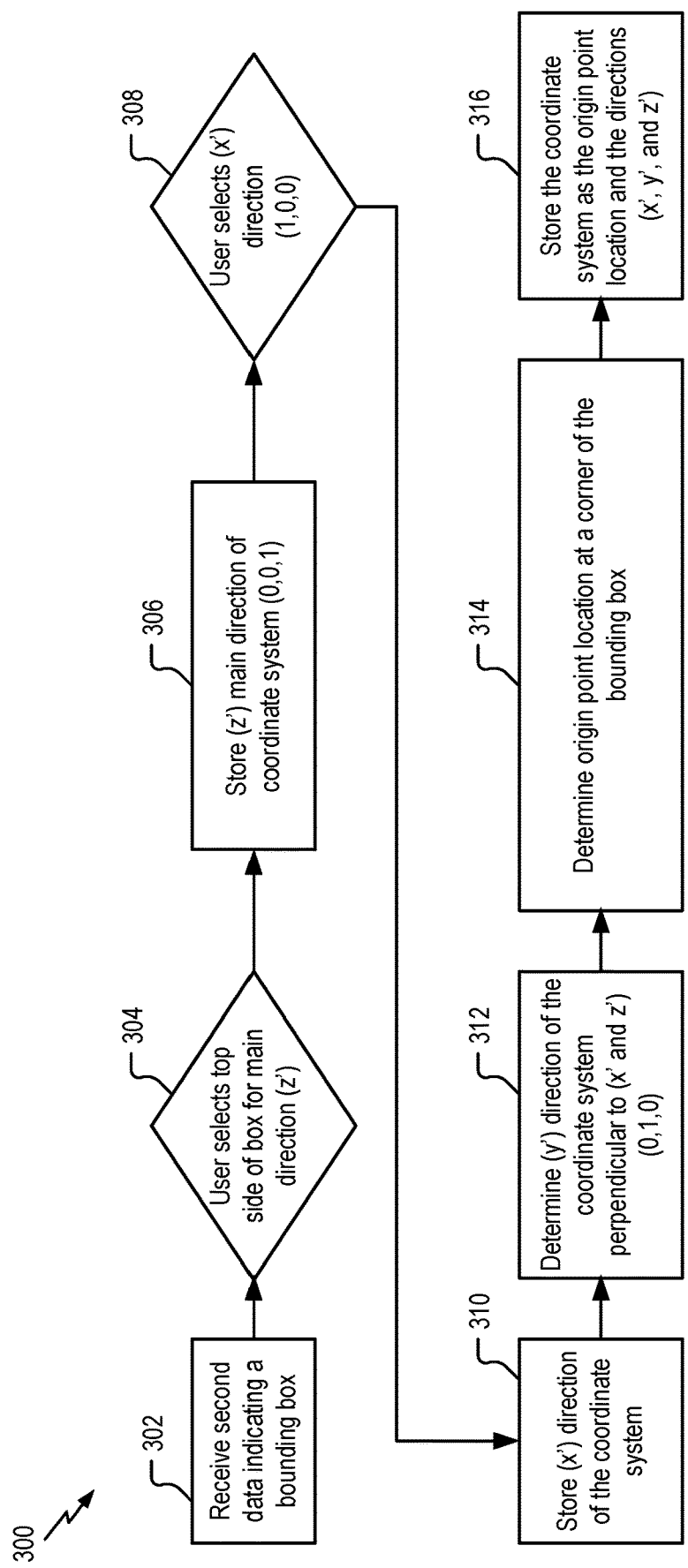
FIG. 3 is a diagram of another example of a method of operation of the device of FIG. 1A.

Referring to FIG. 3, another particular example of a method is depicted and generally designated 300. In a particular implementation, operations of the method 300 are initiated, performed, or controlled by the processor 136, such as by executing the instructions 134. The method 300 illustrates operations that can be performed (e.g., by the processor 136) to locate and orient the bounding box 116 (of FIG. 1C) in a coordinate system that can be mapped to positions on the work table 142, such as the second coordinate system 167 of FIG. 1C.

The method 300 includes receiving second data indicating a bounding box, at 302. In a particular example, the second data corresponds to the second data 112, and the bounding box corresponds to the bounding box 116. In some examples, the processor 136 is configured to receive the second data 112 from the memory 132, such as after generating the second data 112 using one or more operations of the method 200 of FIG. 2. In another example, the processor 136 is configured to receive the second data 112 from another source, such as from a device or a server via a communication network.

The method 300 includes receiving user selection of a top side of the bounding box, where the top side indicates a main direction, such as the z' direction of the second coordinate system 167 of FIG. 1C, at 304. For example, in some implementations, the user selection is received via the GUI 152 of FIG. 1A. In a particular example, the GUI 152 prompts a user to select the top side (or another side) of the bounding box 116 as the main direction.

The method 300 further includes storing the main direction of a coordinate system (e.g., the second coordinate system 167 of FIG. 1C), at 306. For example, in some implementations, the third data 122 is generated or modified to indicate the main direction.

The method 300 further includes receiving user selection of a direction, at 308, and storing an indication of the direction, at 310. In a particular example, the GUI 152 prompts the user to define the direction. In a particular example, the direction corresponds to the x' direction of the second coordinate system 167 of FIG. 1C.

The method 300 further includes determining another direction of the coordinate system that is perpendicular to the other directions, at 312. In a particular example, the other direction corresponds to a y' direction of the second coordinate system 167 of FIG. 1C.

The method 300 further includes determining an origin point location (e.g., a location of the index point 163 of FIG. 1C) at a corner of the bounding box, at 314. The method 300 further includes storing the coordinate system as the origin point location and the directions (e.g., the x', y', and z' directions), at 316. In a particular example, the third data 122 indicates one or more of the origin point location and the directions. In a particular example, the processor 136 stores the third data 122 to the memory 132.

By determining a coordinate system (e.g., the second coordinate system 167 of FIG. 1C) as described with reference to the method 300 of FIG. 3, accuracy and efficiency of design of the workholding frame 166 can be increased. As a particular illustrative example, the second coordinate system 167 may be used to position the object 168 in a machine space associated with the machine space associated with the machining equipment 160 of FIG. 1A (e.g., instead of a model space associated with the first coordinate system 165 of FIG. 1B).

Figure 4:
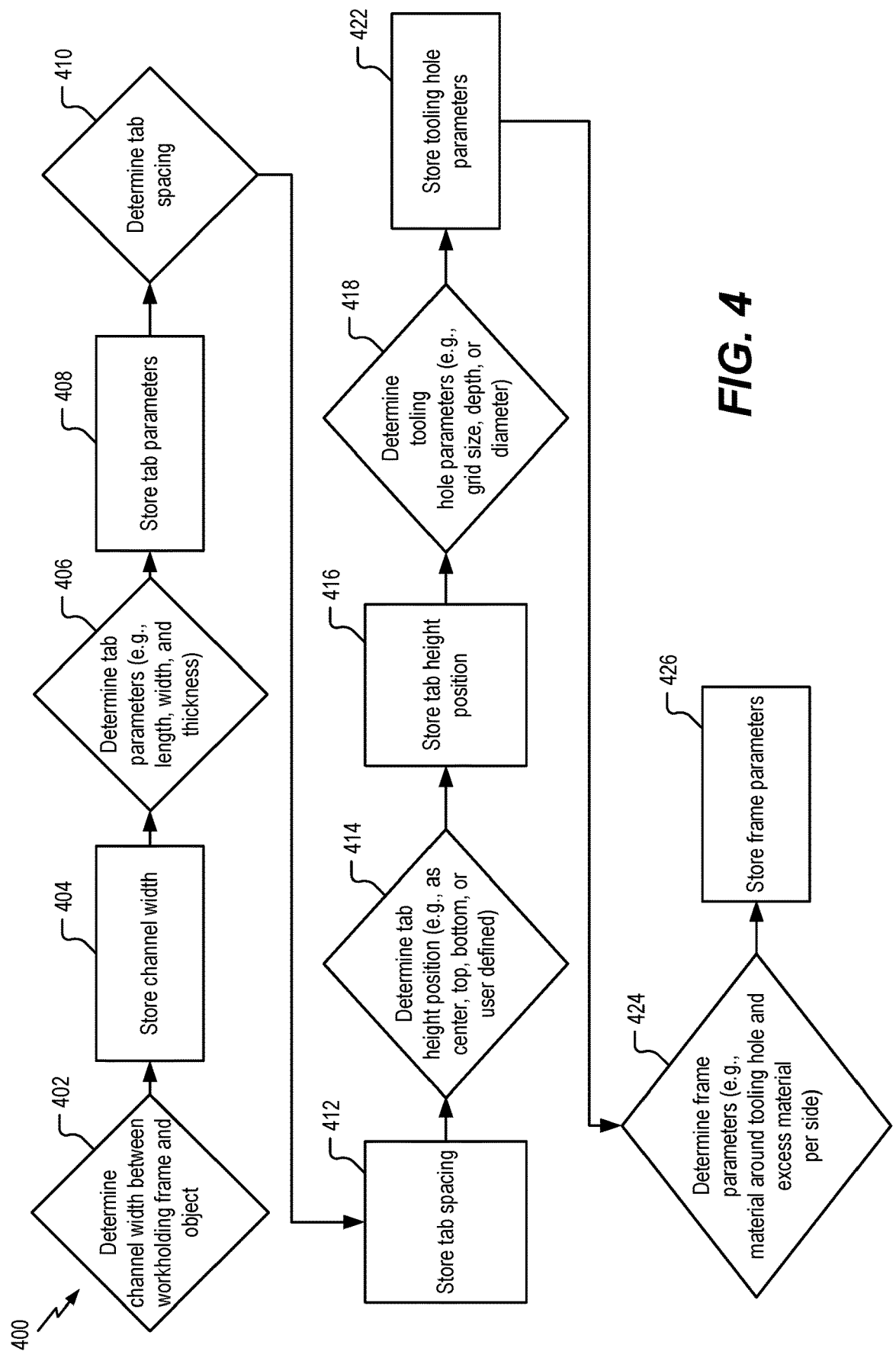
FIG. 4 is a diagram of another example of a method of operation of the device of FIG. 1A.

Referring to FIG. 4, a particular illustrative example of a method is depicted and generally designated 400. In a particular implementation, operations of the method 400 are initiated, performed, or controlled by the processor 136, such as by executing the instructions 134.

The method 400 includes determining a channel width between a workholding frame and an object, at 402. In a particular example, the processor 136 is configured to determine the width 182 of the channel 180 between the workholding frame 166 and the object 168 using one or more techniques described herein.

The method 400 further includes storing an indication of the channel width, at 404. A particular example, the processor 136 stores an indication of the width 182 of the channel 180 in the third data 122.

The method 400 further includes determining one or more tab parameters, at 406. For example, in some implementations, the processor 136 determines one or more parameters of the tab 184, such as a length of the tab 184, a width of the tab 184, or thickness of the tab 184.

The method 400 further includes storing the one or more tab parameters, at 408. For example, in some implementations, the processor 136 is configured to update the third data 122 to indicate one or more parameters of the tab 184.

The method 400 further includes determining a tab spacing, at 410, and storing an indication of the tab spacing, at 412. For example, in some implementations, the processor 136 is configured to identify or determine a spacing between multiple tabs of the workpiece 164 and to update the third data 122 to indicate the tab spacing.

The method 400 further includes determining a tab height position, at 414. In various examples, the tab height position corresponds to a center position, a top position, a bottom position, or another position, such as a user defined position. The method 400 further includes storing the tab height position, at 416. For example, in some implementations, the processor 136 is configured to update the third data 122 to indicate the tab height position.

The method 400 further includes determining one or more tooling hole parameters, at 418. In one example, the one or more tooling hole parameters are associated with the tooling hole 188. In a particular example, the one or more tooling hole parameters indicate one or more of the tooling hole spacing 190 associated with the tooling holes 188, 196 (shown in FIG. 1H), a depth associated with the tooling hole 188, or the diameter 186 of the tooling hole 188. The method 400 further includes the storing the one or more tooling hole parameters, at 422. For example, in some implementations, the processor 136 is configured to update the third data 122 to indicate the one or more tooling hole parameters.

The method 400 further includes determining one or more frame parameters, at 424. In a particular example, the one or more frame parameters include material around the tooling hole 188 (e.g., the material 192) or an amount of excess material per side of the workpiece 164, such as the excess material 154. The method 400 includes storing the one or more frame parameters, at 426. For example, in some implementations, the processor 136 is configured to update the third data 122 to indicate the one or more frame parameters.

By determining parameters as described with reference to the method 400 of FIG. 4, accuracy and efficiency of design of the workholding frame 166 can be increased. As a particular illustrative example, in some implementations, the processor 136 of FIG. 1A is configured to automatically determine parameters of the workholding frame 166 based on one or more characteristics of object 168 indicated by the first 3D model 104.

Figure 5:
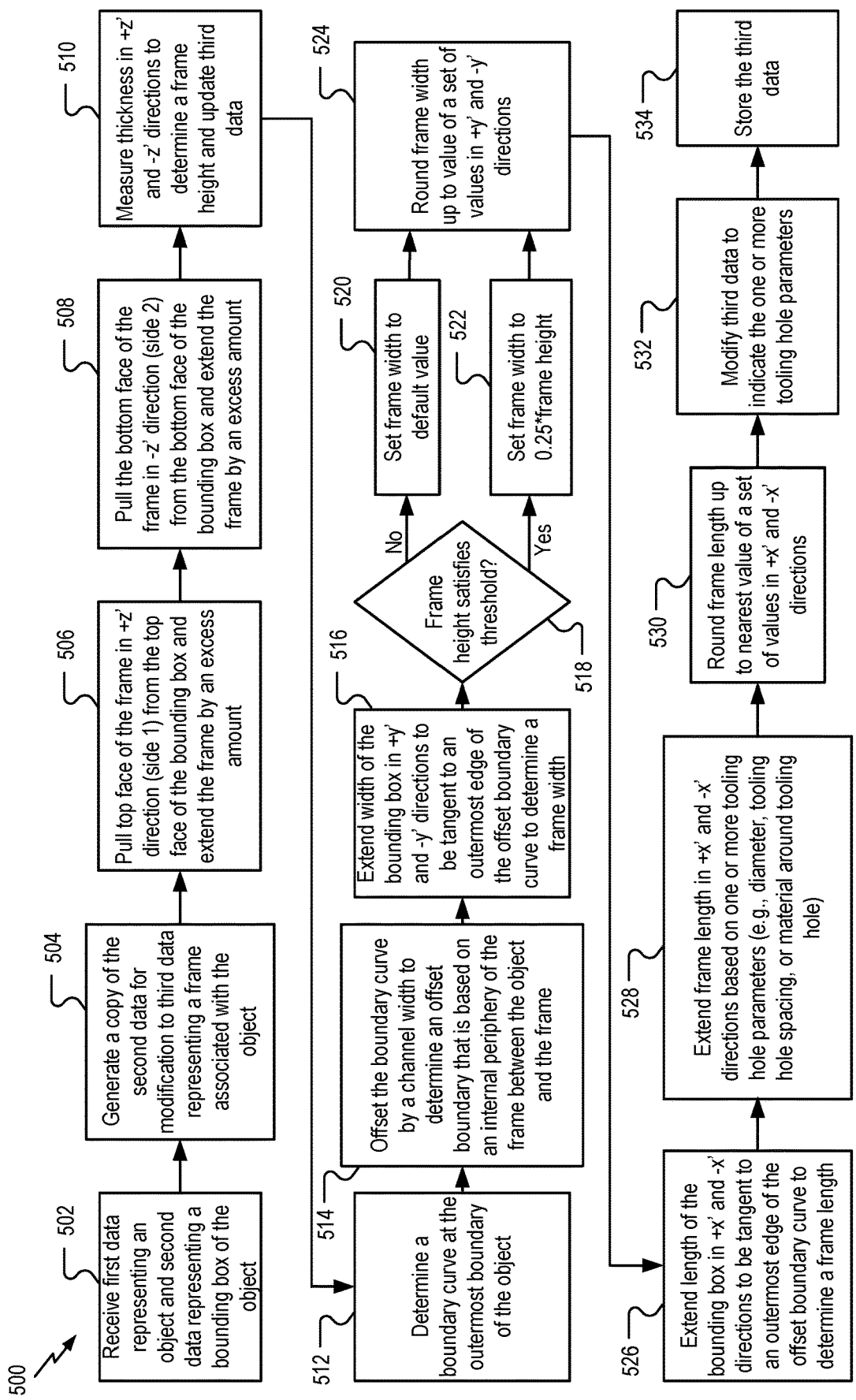
FIG. 5 is a diagram of another example of a method of operation of the device of FIG. 1A.

Referring to FIG. 5, a particular illustrative example of a method is depicted and generally designated 500. In a particular implementation, operations of the method 500 are initiated, performed, or controlled by the processor 136, such as by executing the instructions 134. The method 500 illustrates operations that can be performed (e.g., by the processor 136) to generate the third data 122 (of FIG. 1A) based on data representing the object 168 and the bounding box 116.

The method 500 includes receiving first data representing an object and second data representing a bounding box of the object, at 502. In a particular example, the first data corresponds to the first data 102, and the object corresponds to the object 168. In a particular example, the second data corresponds to the second data 112, and the bounding box corresponds to the bounding box 116.

The method 500 further includes generating a copy of the second data for modification to third data representing a frame associated with the object, at 504. For example, in some implementations, the second data 112 is copied as a temporary file for modification to generate the third data 122. In a particular example, the frame corresponds to the workholding frame 166 of FIG. 1A.

The method 500 further includes pulling a top face of the frame in the positive z' direction (e.g., along the z' axis of the second coordinate system 167 of FIG. 1C) from a top face of the bounding box and extending the frame by an excess amount, at 506. In a particular example, the excess amount corresponds to a height of the excess material 154 (shown in FIGS. 1D and 1F).

The method 500 further includes pulling the bottom face of the frame in the negative z' direction (e.g., along the z' axis of the second coordinate system 167 of FIG. 1C) from the bottom face of the bounding box and extending the frame by an excess amount, at 508. In a particular example, the excess amount corresponds to a height of the excess material 154 (shown in FIGS. 1D and 1F).

The method 500 further includes measuring thickness in the positive z' and negative z' directions to determine a frame height and updating the third data, at 510. In one example, the frame height corresponds to the frame height 176 (shown in FIG. 1F), and the third data 122 is updated to indicate the frame height 176.

The method 500 further includes determining a boundary curve at the outermost boundary of the object, at 512. In one example, the boundary curve of the object corresponds to a surface of the object 168, such as the surface 170. In one example, the surface adjoins the channel 180.

The method 500 further includes offsetting the boundary curve by a channel width to determine an offset boundary that is based on an internal periphery of the frame between the object and the frame, at 514. In one example, the channel width corresponds to the width 182 of the channel 180 (shown in FIG. 1E).

The method 500 further includes extending a width of the bounding box in the positive y' and negative y' directions (e.g., along the y' axis of the second coordinate system 167 of FIG. 1E) to be tangent to an outermost edge of the offset boundary curve to determine a frame width, at 516. In a particular example, the frame width corresponds to the frame width 177 (shown in FIG. 1E).

The method 500 further includes determining whether a frame height satisfies a threshold, at 518. In a particular example, the threshold corresponds to the threshold 128 of FIG. 1A. In a non-limiting particular example, the threshold corresponds to 4 inches. In other examples, the threshold corresponds to another number.

In response to determining that the frame height does not satisfy the threshold, the method 500 further includes setting the frame width to a default value, at 520. In one example, the default value corresponds to the default value 130 (shown in FIG. 1A). In a non-limiting particular example, the default value corresponds to 1 inch. In other examples, the default value can correspond to another number.

Alternatively, in response to determining that the frame height satisfies the threshold, the method 500 further includes determining the frame width based on the frame height, at 522. In a particular example, the processor 136 determines the frame width 177 (shown in FIG. 1E) by multiplying the frame height 176 by a coefficient or another parameter, such as 0.25 as depicted in the particular example of FIG. 5.

The method 500 further includes rounding the frame width up to a nearest value of a set of values in positive y' and negative y' directions, at 524. For example, in some implementations, the processor 136 is configured to round the frame width 177 to the nearest value 138 of the set of values 140 (shown in FIG. 1A). In a particular example, the set of values 140 corresponds to increments of 0.25 inches. In other examples, the set of values 140 can correspond to other values.

The method 500 further includes extending length of the bounding box in the positive x' and negative x' directions (e.g., along the x' axis of the second coordinate system 167 of FIG. 1E) to be tangent to outermost edge of the offset boundary curve to determine a frame length, at 526. In one example, the frame length corresponds to the frame length 178.

The method 500 further includes extending the frame length in the positive x' and negative x' directions (e.g., along the x' axis of the second coordinate system 167 of FIG. 1E) based on one or more tooling hole parameters, at 528. In some examples, the one or more tooling hole parameters correspond to one or more of the diameter 186 of the tooling hole 188, the tooling hole spacing 190 associated with the tooling holes 188, 196, or the material 192 around the tooling hole 188.

The method 500 further includes rounding the frame length up to a nearest value of a set of values in the positive x' and negative x' directions, at 530. For example, in some implementations, the frame length 178 is rounded to the nearest value 138 of the set of values 140 (shown in FIG. 1A), such as described with reference to the frame width 177.

The method 500 further includes modifying the third data to indicate the one or more tooling hole parameters, at 532. For example, in some implementations, the third data 122 is modified or updated to indicate the one or more tooling hole parameters associated with the tooling hole 188.

The method 500 further includes storing the third data, at 534. For example, in some implementations, the processor 136 is configured to send the third data 122 to be stored to the memory 132 of FIG. 1A.

By generating third data based on a bounding box enclosing the first 3D model 104 of FIG. 1A as described with reference to the method 500 of FIG. 5, accuracy and efficiency of design of the workholding frame 166 can be increased. As a particular illustrative example, in some implementations, the processor 136 of FIG. 1A is configured to determine dimensions of the workholding frame 166 using the bounding box.

Figure 6:
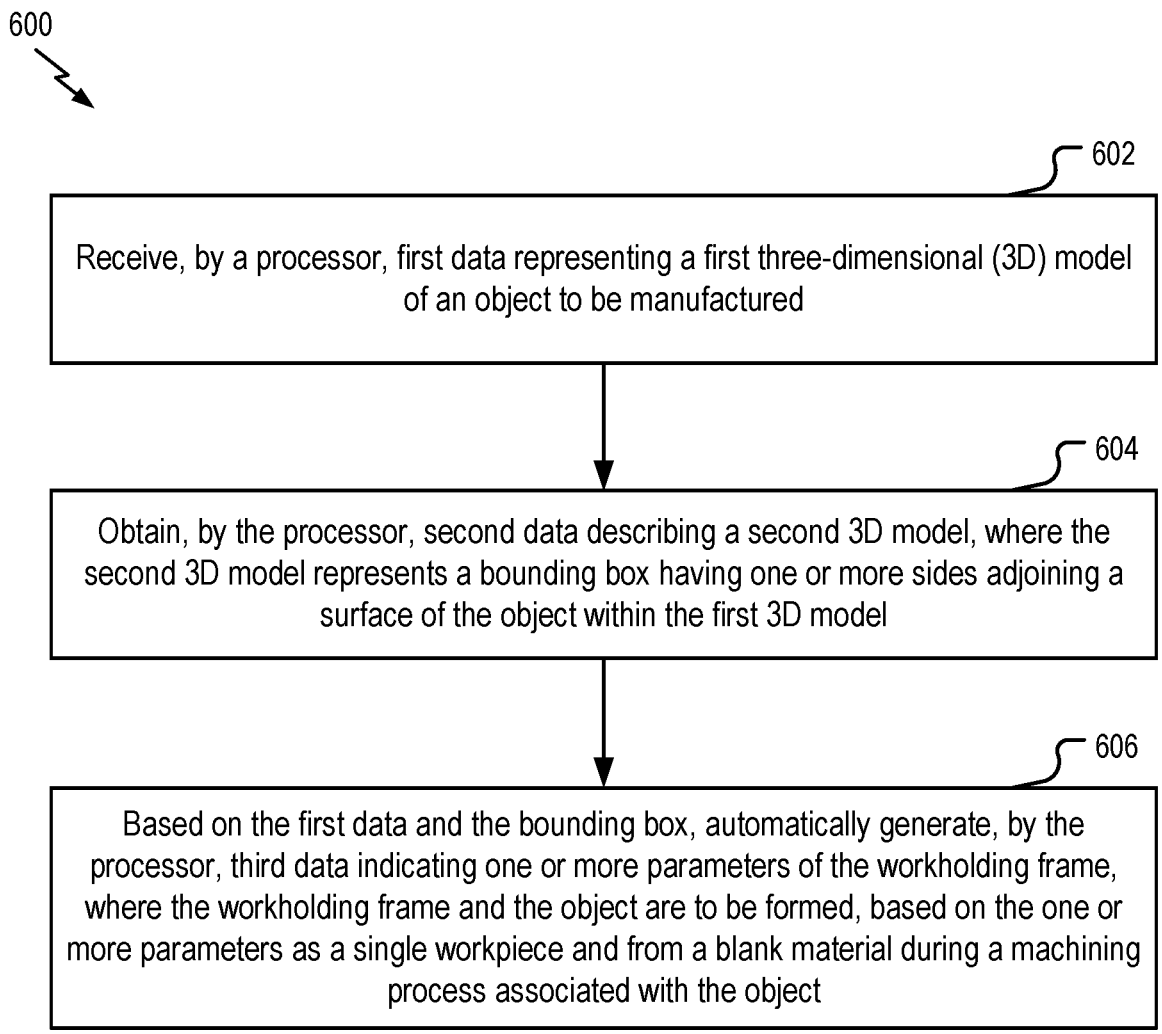
FIG. 6 is a diagram of another example of a method of operation of the device of FIG. 1A.

Referring to FIG. 6, a particular illustrative example of a method of processor-aided design of a workholding frame for a manufacturing process is depicted and generally designated 600. In a particular implementation, operations of the method 600 are initiated, performed, or controlled by the processor 136, such as by executing the instructions 134.

The method 600 includes receiving, by a processor, first data representing a first three-dimensional (3D) model of an object to be manufactured, at 602. In one example, the processor 136 of FIG. 1A receives the first data 102 representing the first 3D model 104 of the object 168.

The method 600 further includes obtaining, by the processor, second data describing a second 3D model, where the second 3D model represents a bounding box having one or more sides adjoining a surface of the object within the first 3D model, at 604. In one example, the processor 136 of FIG. 1A obtains the second data 112 representing the bounding box 116 having one or more sides (e.g., the side 172) adjoining a surface (e.g., the surface 170) of the object 168 within the first 3D model 104. In some examples, the processor 136 is configured to generate the second data 112 based on the first data 102, such as by performing operations of the method 200 of FIG. 2. In other examples, the processor 136 receives the second data 112 from another device or a server.

The method 600 further includes automatically generating by the processor, based on the first data and the bounding box, third data indicating one or more parameters of the workholding frame, where the workholding frame and the object are to be formed based on the one or more parameters and as a single workpiece from a blank material during a machining process associated with the object, at 606. In one example, the processor 136 of FIG. 1A is configured to automatically generate, based on the first data 102 and the second data 112, the third data 122 indicating the one or more parameters 124 associated with the workholding frame 166. In a particular example, the workholding frame 166 and the object 168 are to be formed from the blank material 162 during a machining process performed by the machining equipment 160.

In a particular illustrative example, automatically generating the third data 122 includes determining a tooling hole (e.g., the tooling hole 188 or the second tooling hole 196) of the workholding frame 166, and the one or more parameters 124 specify the tooling hole. To illustrate, in one example, one or more of the tooling hole 188 or the second tooling 196 is determined based on the grid parameters 147 (e.g., by determining a placement of the tooling hole 188 so that the tooling hole 188 is aligned or substantially aligned with a corresponding tooling hole of the grid of tooling holes 146).

In some implementations, automatically generating the third data 122 includes shifting one or more sides of the second 3D model 114 to be offset, in a first direction (e.g., along the z' direction of the second coordinate system 167 of FIGS. 1C-1F), from the first 3D model 104 by the first offset distance D1 to determine the frame height 176 associated with the workholding frame 166, as illustrated in the example of FIG. 1D. In some examples, the workholding frame 166 and the object 168 are included in the workpiece 164, and the first offset distance D1 is selected to enable the frame height 176 to provide a substantially planar first surface of the workpiece to couple to the work table 142 (or to another surface of the machining equipment 160).

Alternatively or in addition, in some examples, automatically generating the third data 122 includes shifting one or more sides of the second 3D model 114 by the second offset distance D2. In a particular example, the second offset distance D2 is determined to define the width 182 of the channel 180 between the object 168 and the workholding frame 166.

Alternatively or in addition, in some examples, automatically generating the third data 122 includes determining whether the frame height 176 indicated by the second 3D model 114 is less than or equal to the threshold 128. In one example, in response to the frame height 176 being less than or equal to the threshold 128, the frame width 177 of the workholding frame 166 is determined based on the default value 130. In another example, in response to the frame height 176 being greater than the threshold 128, the frame width 177 is determined based on the frame height 176 (e.g., by multiplying the frame height 176 by a coefficient or another value, as described with reference to the example of FIG. 5). In some examples, after determining the frame width 177 (e.g., based on the frame height 176), the frame width 177 is rounded to the nearest value 138 that is greater than the frame width 177 and that is included in the particular set of values 140.

In some implementations, automatically generating the third data 122 includes determining the frame length 178 based on one or more characteristics of the tooling hole 188. To illustrate, in some examples, the frame length 178 is determined based on one or more of the diameter 186 of the tooling hole 188, the tooling hole spacing 190 of the tooling holes 188, 196, or the material 192 between the edge 194 of the tooling hole 188 and the workholding frame 166.

In some implementations, the method 600 further includes fabricating the object 168 using the workholding frame 166. For example, in some implementations, the machining equipment 160 of FIG. 1A is configured to fabricate the workholding frame 166 and the object 168 by machining the blank material 162. In a particular example, the workholding frame 166 and the object 168 are fabricated as a single, monolithic piece corresponding to the workpiece 164. In some implementations, the method 600 further includes separating the workholding frame 166 and the object 168 after machining by the machining equipment 160 (e.g., by cutting or breaking the workholding frame 166 from the object 168).

By performing processor-aided design of a workholding frame as described with reference to the method 600 of FIG. 6, accuracy and efficiency of design of the workholding frame can be increased. As a particular illustrative example, the workholding frame 166 of FIG. 1A can have dimensions that are based on the bounding box 116 indicated by the second 3D model 114. Alternatively or in addition, by fabricating the workholding frame 166 and the object 168 as a single, monolithic piece, expenditure of time and resources used to separately fabricate the workholding frame 166 and the object 168 are reduced. As an additional benefit, instances of the object 168 "slipping" from the workholding frame 166 during machining are reduced or avoided by manufacturing the object 168 and the workholding frame 166 as a single, monolithic piece (e.g., as compared to coupling the workholding frame 166 to the object 168 using fasteners).

Figure 7:
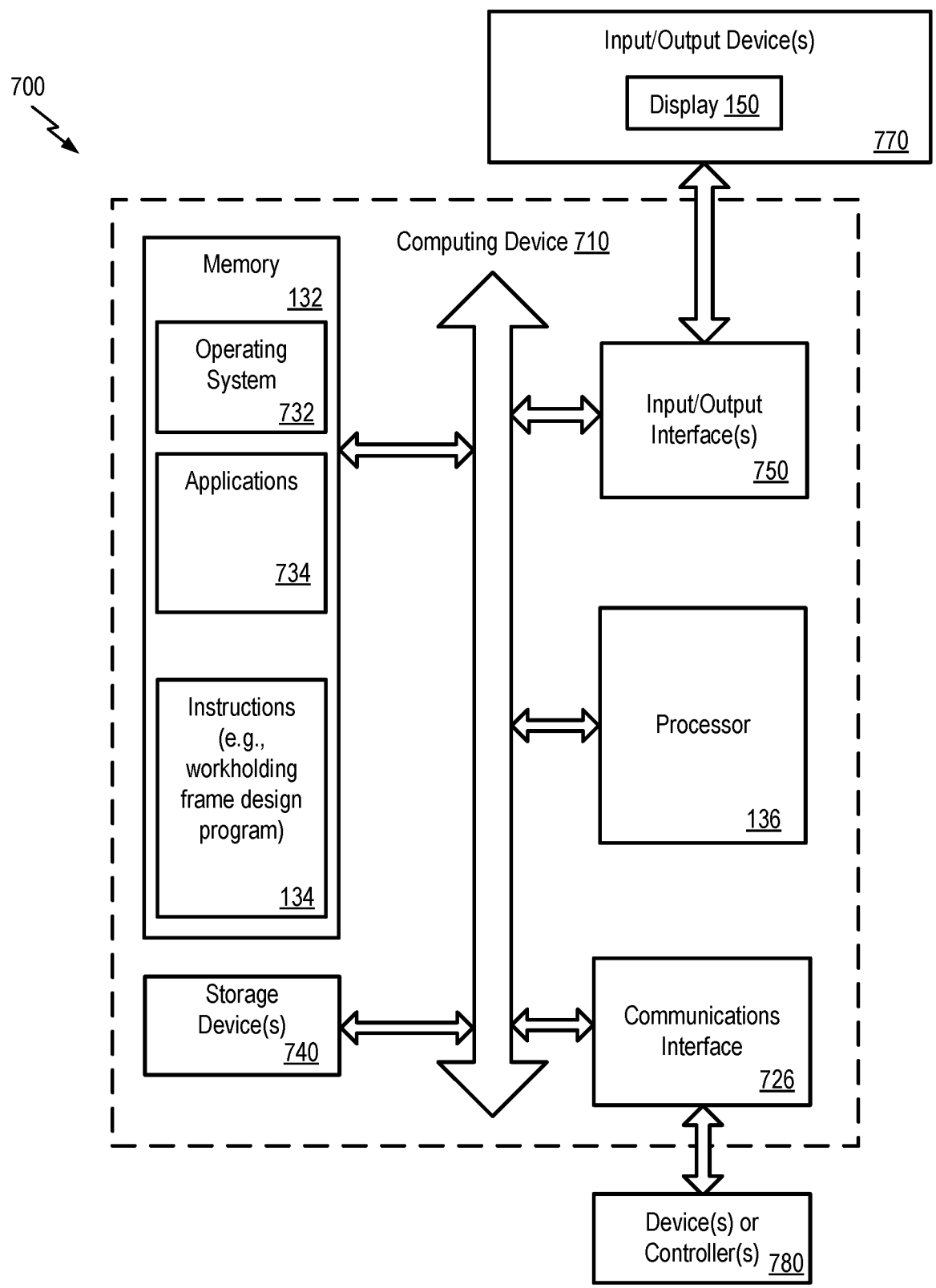
FIG. 7 is a block diagram illustrating aspects of an example of a computing system that is configured to execute instructions to initiate, perform, or control operations of one or more of the methods of FIGS. 2-6.

FIG. 7 is an illustration of a block diagram of a computing environment 700 including a computing device 710 (e.g., the device 120 of FIG. 1A) configured to support embodiments of computer-implemented methods and computer-executable program instructions (or code) according to the present disclosure. In some examples, the computing device 710, or portions thereof, executes instructions to initiate, perform, or control operations described herein. For example, in some implementations, the computing device 710 performs operations of any of the method 200 of FIG. 2, the method 300 of FIG. 3, the method 400 of FIG. 4, the method 500 of FIG. 5, or the method 600 of FIG. 6.

The computing device 710 includes the processor 136. The processor 136 is configured to communicate with the memory 132 (e.g., a system memory or another memory), one or more storage devices 740, one or more input/output interfaces 750, a communications interface 726, or a combination thereof.

Depending on the particular implementation, the memory 132 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 7, the memory 132 stores an operating system 732, which can include a basic input/output system for booting the computing device 710 as well as a full operating system to enable the computing device 710 to interact with users, other programs, and other devices. The particular example of FIG. 7 also depicts that the memory 132 stores one or more applications 734 executable by the processor 136. In some examples, the one or more applications 734 include instructions executable by the processor 136 to transmit signals between components of the computing device 710, such as the memory 132, the one or more storage devices 740, the one or more input/output interfaces 750, the communications interface 726, or a combination thereof.

In some implementations, one or more storage devices 740 include nonvolatile storage devices, such as magnetic disks, optical disks, or flash memory devices. In some examples, the one or more storage devices 740 include removable memory devices, non-removable memory devices or both. In some cases, the one or more storage devices 740 are configured to store an operating system, images of operating systems, applications, and program data. In a particular example, the memory 132, the one or more storage devices 740, or both, include tangible computer-readable media.

In the example of FIG. 7, the processor 136 is configured to communicate with the one or more input/output interfaces 750 to enable the computing device 710 to communicate with one or more input/output devices 770 to facilitate user interaction. In some implementations, the one or more input/output interfaces 750 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 770 include keyboards, pointing devices, displays, speakers, microphones, touch screens, one or more other devices, or a combination thereof. In some examples, the processor 136 is configured to detect interaction events based on user input received via the one or more input/output interfaces 750. Additionally, in some implementations, the processor 136 is configured to send a display to a display device via the one or more input/output interfaces 750. In some implementations, the one or more input/output devices 770 include the display 150.

In a particular example, the processor 136 is configured to communicate with (or send signals to) one or more devices 780 using the communications interface 726. In some implementations, the communications interface 726 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 780 include host computers, servers, workstations, one or more other computing devices, or a combination thereof.

The illustrations of the examples described herein are intended to provide a general understanding of the structure of the various implementations. The illustrations are not intended to serve as a complete description of all of the elements and features of apparatuses, systems, and computer-readable media that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of processor-aided design of a workholding frame for a manufacturing process, the method comprising:
using a processor to perform operations including:
receiving first data representing a first three-dimensional (3D) model of an object to be manufactured;
obtaining second data describing a second 3D model, wherein the second 3D model represents a bounding box having one or more sides adjoining a surface of the object within the first 3D model, wherein the bounding box defines a space that encloses the first 3D model; and
based on the first data and the bounding box, automatically generating third data indicating one or more parameters of the workholding frame, wherein the one or more parameters comprise a plurality of offset distances from the bounding box, wherein the workholding frame and the object are to be formed by a subtractive process based on the one or more parameters as a single workpiece from a blank of material during a machining process associated with the object, and wherein the workholding frame surrounds a portion of the object and is attached to the object by one or more tabs of the material formed by the machining process before separation of the workholding frame from the object.

2. The method of claim 1, wherein automatically generating the third data includes shifting one or more sides of the second 3D model to be offset, in a first direction, from the first 3D model by a first offset distance of the plurality of offset distances to determine a frame height associated with the workholding frame.

3. The method of claim 2, wherein the first offset distance is selected to enable the frame height to provide a substantially planar first surface of the single workpiece to couple to a work table.

4. The method of claim 1, wherein automatically generating the third data includes shifting one or more sides of the second 3D model by a second offset distance of the plurality of offset distances, and wherein the second offset distance is determined to define a width of a channel between the object to be manufactured and the workholding frame.

5. The method of claim 1, wherein automatically generating the third data includes determining whether a frame height indicated by the second 3D model is less than or equal to a threshold.

6. The method of claim 5, further comprising, in response to the frame height being less than or equal to the threshold, determining a frame width of the workholding frame based on a default value.

7. The method of claim 5, further comprising, in response to the frame height being greater than the threshold, determining a frame width of the workholding frame based on the frame height.

8. The method of claim 7, further comprising, after determining the frame width, rounding the frame width to a nearest value that is greater than the frame width and that is included in a particular set of values.

9. The method of claim 1, wherein automatically generating the third data includes determining a frame length of the workholding frame based on one or more of a diameter of a tooling hole of the workholding frame, a tooling hole spacing associated with the workholding frame, or material between an edge of the tooling hole and the workholding frame.

10. A system for designing a workholding frame for a manufacturing process, the system comprising:
a memory configured to store instructions; and
a processor configured to:
receive first data representing a first three-dimensional (3D) model of an object to be manufactured, to obtain second data describing a second 3D model, wherein the second 3D model represents a bounding box having one or more sides adjoining a surface of the object within the first 3D model, wherein the bounding box defines a space that encloses the first 3D model; and
execute the instructions to automatically generate, based on the first data and the bounding box, third data indicating one or more parameters of the workholding frame, wherein the workholding frame and the object are to be formed by a subtractive process based on the one or more parameters as a single workpiece from a blank of material during a machining process associated with the object, and wherein the workholding frame surrounds a portion of the object and is attached to the object by one or more tabs of the material formed by the machining process before separation of the workholding frame from the object.

11. The system of claim 10, wherein the processor is further configured to automatically generate the third data by shifting one or more sides of the second 3D model to be offset, in a first direction, from the first 3D model by a first offset distance to determine a frame height associated with the workholding frame.

12. The system of claim 11, wherein the processor is further configured to select the first offset distance to enable the frame height to provide a substantially planar first surface of the single workpiece to couple to a work table.

13. The system of claim 10, further comprising a work table including a grid of tooling holes and one or more tooling pins disposed in particular tooling holes of the grid of tooling holes.

14. The system of claim 13, wherein the workholding frame includes one or more tooling holes arranged to align with tooling holes of the grid of tooling holes to receive the one or more tooling pins.

15. A tangible computer-readable medium storing instructions executable by a processor to initiate, perform, or control operations to aid in design of a workholding frame for a manufacturing process, the operations comprising:

receiving first data representing a first three-dimensional (3D) model of an object to be manufactured;
obtaining second data describing a second 3D model, wherein the second 3D model represents a bounding box having one or more sides adjoining a surface of the object within the first 3D model, wherein the bounding box defines a space that encloses the first 3D model; and
based on the first data and the bounding box, automatically generating third data indicating one or more parameters of the workholding frame, wherein the workholding frame and the object are to be formed by a subtractive process based on the one or more parameters as a single workpiece from a blank of material during a machining process associated with the object, and wherein the workholding frame surrounds a portion of the object and is attached to the object by one or more tabs of the material formed by the machining process before separation of the workholding frame from the object.

16. The tangible computer-readable medium of claim 15, wherein automatically generating the third data includes shifting one or more sides of the second 3D model to be offset, in a first direction, from the first 3D model by a first offset distance, and wherein the first offset distance is selected to provide a substantially planar first surface of the single workpiece to couple to a work table.

17. The tangible computer-readable medium of claim 16, wherein the first offset distance is selected to enable a frame height of the workholding frame to provide a substantially planar first surface of the single workpiece to couple to a work table.

18. The tangible computer-readable medium of claim 15, wherein automatically generating the third data includes shifting one or more sides of the second 3D model by a second offset distance and to determine the second offset distance to define a width of a channel between the object to be manufactured and the workholding frame.

19. The tangible computer-readable medium of claim 15, wherein automatically generating the third data includes determining whether a frame height indicated by the second 3D model is less than or equal to a threshold.

20. The tangible computer-readable medium of claim 19, wherein the operations further include determining, in response to the frame height being less than or equal to the threshold, a frame width of the workholding frame based on a default value.

21. The tangible computer-readable medium of claim 19, wherein the operations further include determining, in response to the frame height being greater than the threshold, a frame width of the workholding frame based on the frame height.

22. The tangible computer-readable medium of claim 21, wherein the operations further include rounding the frame width to a nearest value after determining the frame width based on the frame height, the nearest value greater than the frame width and included in a particular set of values.

23. The tangible computer-readable medium of claim 15, wherein automatically generating the third data includes determining a frame length of the workholding frame based on one or more of a diameter of a tooling hole of the workholding frame.

24. The tangible computer-readable medium of claim 15, wherein automatically generating the third data includes determining a frame length of the workholding frame based on a tooling hole spacing associated with the workholding frame.

25. The tangible computer-readable medium of claim 15, wherein automatically generating the third data includes determining a frame length of the workholding frame based on material between an edge of a tooling hole and the workholding frame.

26. The tangible computer-readable medium of claim 15, wherein automatically generating the third data includes determining a tooling hole of the workholding frame, and wherein the one or more parameters specify the tooling hole of the workholding frame.

27. The tangible computer-readable medium of claim 26, wherein the tooling hole is determined based on grid parameters associated with a work table.

\* \* \* \* \*